US006956624B2

(12) United States Patent
Hirata et al.

(10) Patent No.: US 6,956,624 B2
(45) Date of Patent: Oct. 18, 2005

(54) OPTICAL PROJECTION APPARATUS, TRANSMISSION TYPE SCREEN, AND PROJECTION TYPE IMAGE DISPLAY APPARATUS

(75) Inventors: Koji Hirata, Yokohama (JP); Naoyuki Ogura, Machida (JP); Masahiko Yatsu, Fujisawa (JP); Hidehiro Ikeda, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 164 days.

(21) Appl. No.: 10/447,999

(22) Filed: May 30, 2003

(65) Prior Publication Data

US 2003/0197812 A1 Oct. 23, 2003

Related U.S. Application Data

(63) Continuation of application No. 09/484,525, filed on Jan. 18, 2000, now Pat. No. 6,573,950.

(30) Foreign Application Priority Data

Jan. 21, 1999 (JP) ........................................... 11-12730

(51) Int. Cl.[7] ............................ H04N 5/64; G02B 5/30

(52) U.S. Cl. ........................ 348/744; 348/744; 359/487

(58) Field of Search ................................ 348/744, 750, 348/756, 759; 353/31, 34, 20, 33, 38, 28–30; 359/487, 495; 349/9

(56) References Cited

U.S. PATENT DOCUMENTS 5,153,752 A 10/1992 Kurematsu et al.
5,255,082 A * 10/1993 Tamada ...................... 348/750
5,264,879 A * 11/1993 Shikama ...................... 353/31
5,311,321 A * 5/1994 Crowley ..................... 348/750
5,317,348 A * 5/1994 Knize .......................... 353/48
5,452,132 A * 9/1995 Kim ........................... 359/649
5,517,263 A * 5/1996 Minich et al. ................ 353/31
5,666,175 A 9/1997 Spitzer et al.
5,704,700 A * 1/1998 Kappel et al. ................ 353/31
5,726,719 A 3/1998 Tanaka et al.
5,729,306 A * 3/1998 Miyake et al. ................. 349/9
5,852,479 A 12/1998 Ueda et al.
5,909,316 A 6/1999 Watanabe
5,920,361 A * 7/1999 Gibeau et al. .............. 348/750
5,978,136 A * 11/1999 Ogawa et al. .............. 359/487
6,019,474 A * 2/2000 Doany et al. ................. 353/31
6,142,633 A * 11/2000 Takahara et al. .............. 353/20
6,186,629 B1 2/2001 Iwamura et al.
6,217,173 B1 4/2001 Huang et al.
6,264,331 B1 7/2001 Sawai et al.
6,273,567 B1 8/2001 Conner et al.
6,295,107 B1 9/2001 Watanabe et al.
6,317,170 B1 * 11/2001 Hwang et al. .............. 348/750
6,328,447 B1 12/2001 Yamazaki et al.
6,331,879 B1 * 12/2001 Sawai et al. ................... 349/9
6,573,950 B1 * 6/2003 Hirata et al. ................ 348/744

FOREIGN PATENT DOCUMENTS

JP 08-076079 3/1996
JP 08-114780 5/1996
JP 09-304734 11/1997
JP 10-111486 4/1998
JP 10-319523 12/1998

* cited by examiner

*Primary Examiner*—Michael H. Lee
*Assistant Examiner*—Paulos M. Natnael
(74) *Attorney, Agent, or Firm*—Antonelli, Terry, Stout & Kraus, LLP

(57) ABSTRACT

An optical projection apparatus includes an optical lighting system provided with a polarized beam splitter for polarizing a white light flux received from a white light source and combining the white light flux with other light fluxes, thereby taking out a predetermined polarized wave; a multi-lens array consisting of a plurality of lens elements; and an irradiator for separating the white light flux into three primary color light fluxes of red, green, and blue and irradiating each of the three color light fluxes on the same display element at an angle different from the others; and a projector for projecting the three primary color light fluxes modulated by the display element. The optical lighting system and the projector are disposed between the white light source and the display element.

16 Claims, 25 Drawing Sheets

FIG. 29

SPECTRAL TRISTIMULUS VALUES OF CIE-XYZ TABLE COLOR

| WAVELENGTH λ (nm) | SPECTRAL TRISTIMULUS VALUES | | |
|---|---|---|---|
| | $\bar{x}\lambda$ | $\bar{y}\lambda$ | $\bar{z}\lambda$ |
| 380 | 0.0014 | 0.0000 | 0.0065 |
| 385 | 0.0022 | 0.0001 | 0.0105 |
| 390 | 0.0042 | 0.0001 | 0.0201 |
| 395 | 0.0076 | 0.0002 | 0.0362 |
| 400 | 0.0143 | 0.0004 | 0.0679 |
| 405 | 0.0232 | 0.0006 | 0.1102 |
| 410 | 0.0435 | 0.0012 | 0.2074 |
| 415 | 0.0776 | 0.0022 | 0.3713 |
| 420 | 0.1344 | 0.0040 | 0.6456 |
| 425 | 0.2148 | 0.0073 | 1.0391 |
| 430 | 0.2839 | 0.0116 | 1.3856 |
| 435 | 0.3285 | 0.0168 | 1.6230 |
| 440 | 0.3483 | 0.0230 | 1.7471 |
| 445 | 0.3481 | 0.0298 | 1.7826 |
| 450 | 0.3362 | 0.0380 | 1.7721 |
| 455 | 0.3187 | 0.0480 | 1.7441 |
| 460 | 0.2908 | 0.0600 | 1.6692 |
| 465 | 0.2511 | 0.0739 | 1.5281 |
| 470 | 0.1954 | 0.0910 | 1.2876 |
| 475 | 0.1421 | 0.1126 | 1.0419 |
| 480 | 0.0956 | 0.1390 | 0.8130 |
| 485 | 0.0580 | 0.1693 | 0.6162 |
| 490 | 0.0320 | 0.2080 | 0.4652 |
| 495 | 0.0147 | 0.2586 | 0.3533 |
| 500 | 0.0049 | 0.3230 | 0.2720 |
| 505 | 0.0024 | 0.4073 | 0.2123 |
| 510 | 0.0093 | 0.5030 | 0.1582 |
| 515 | 0.0291 | 0.6082 | 0.1117 |
| 520 | 0.0633 | 0.7100 | 0.0782 |
| 525 | 0.1096 | 0.7932 | 0.0573 |
| 530 | 0.1655 | 0.8620 | 0.0422 |
| 535 | 0.2257 | 0.9149 | 0.0298 |
| 540 | 0.2904 | 0.9540 | 0.0203 |
| 545 | 0.3597 | 0.9803 | 0.0134 |
| 550 | 0.4334 | 0.9950 | 0.0087 |
| 555 | 0.5121 | 1.0002 | 0.0057 |
| 560 | 0.5945 | 0.9950 | 0.0039 |
| 565 | 0.6784 | 0.9736 | 0.0027 |
| 570 | 0.7621 | 0.9520 | 0.0021 |
| 575 | 0.8425 | 0.9154 | 0.0018 |
| 580 | 0.9163 | 0.8700 | 0.0017 |
| 585 | 0.9786 | 0.8163 | 0.0014 |
| 590 | 1.0263 | 0.7570 | 0.0011 |
| 595 | 1.0567 | 0.6949 | 0.0010 |
| 600 | 1.0622 | 0.6310 | 0.0008 |
| 605 | 1.0456 | 0.5668 | 0.0006 |
| 610 | 1.0026 | 0.5030 | 0.0003 |
| 615 | 0.9384 | 0.4412 | 0.0002 |
| 620 | 0.8544 | 0.3810 | 0.0002 |
| 625 | 0.7514 | 0.3210 | 0.0001 |
| 630 | 0.6424 | 0.2650 | 0.0000 |
| 635 | 0.5419 | 0.2170 | 0.0000 |
| 640 | 0.4479 | 0.1750 | 0.0000 |
| 645 | 0.3608 | 0.1382 | 0.0000 |
| 650 | 0.2835 | 0.1070 | 0.0000 |
| 655 | 0.2187 | 0.0816 | 0.0000 |
| 660 | 0.1649 | 0.0610 | 0.0000 |
| 665 | 0.1212 | 0.0446 | 0.0000 |
| 670 | 0.0874 | 0.0320 | 0.0000 |
| 675 | 0.0636 | 0.0232 | 0.0000 |
| 680 | 0.0468 | 0.0170 | 0.0000 |
| 685 | 0.0329 | 0.0119 | 0.0000 |
| 690 | 0.0227 | 0.0082 | 0.0000 |
| 695 | 0.0158 | 0.0057 | 0.0000 |
| 700 | 0.0114 | 0.0041 | 0.0000 |
| 705 | 0.0081 | 0.0029 | 0.0000 |
| 710 | 0.0058 | 0.0021 | 0.0000 |
| 715 | 0.0041 | 0.0015 | 0.0000 |
| 720 | 0.0029 | 0.0010 | 0.0000 |
| 725 | 0.0020 | 0.0007 | 0.0000 |
| 730 | 0.0014 | 0.0005 | 0.0000 |
| 735 | 0.0010 | 0.0004 | 0.0000 |
| 740 | 0.0007 | 0.0003 | 0.0000 |
| 745 | 0.0005 | 0.0002 | 0.0000 |
| 750 | 0.0003 | 0.0001 | 0.0000 |
| 755 | 0.0002 | 0.0001 | 0.0000 |
| 760 | 0.0002 | 0.0001 | 0.0000 |
| 765 | 0.0001 | 0.0000 | 0.0000 |
| 770 | 0.0001 | 0.0000 | 0.0000 |
| 775 | 0.0000 | 0.0000 | 0.0000 |
| 780 | 0.0000 | 0.0000 | 0.0000 |
| TOTALS: | 21.3713 | 21.3714 | 21.3715 |

FIG. 30

SPECTRAL TRISTIMULUS VALUES OF CIE-$X_{10}Y_{10}Z_{10}$ TABLE COLOR

| WAVELENGTH (nm) | SPECTRAL TRISTIMULUS VALUES | | | WAVELENGTH (nm) | SPECTRAL TRISTIMULUS VALUES | | |
|---|---|---|---|---|---|---|---|
| | $(\bar{x}_{10})\lambda$ | $(\bar{y}_{10})\lambda$ | $(\bar{z}_{10})\lambda$ | | $(\bar{x}_{10})\lambda$ | $(\bar{y}_{10})\lambda$ | $(\bar{z}_{10})\lambda$ |
| 380 | 0.0002 | 0.0000 | 0.0007 | 580 | 1.0142 | 0.8689 | 0.0000 |
| 385 | .0007 | .0001 | .0029 | 585 | 1.0743 | .8256 | |
| 390 | .0024 | .0003 | .0105 | 590 | 1.1185 | .7774 | |
| 395 | .0072 | .0008 | .0323 | 595 | 1.1343 | .7204 | |
| 400 | .0191 | .0020 | .0860 | 600 | 1.1240 | .6583 | |
| 405 | .0434 | .0045 | .1971 | 605 | 1.0891 | .5939 | |
| 410 | .0847 | .0088 | .3894 | 610 | 1.0305 | .5280 | |
| 415 | .1406 | .0145 | .6568 | 615 | 0.9507 | .4618 | |
| 420 | .2045 | .0214 | .9725 | 620 | .8563 | .3981 | |
| 425 | .2647 | .0295 | 1.2825 | 625 | .7649 | .3396 | |
| 430 | .3147 | .0387 | 1.5535 | 630 | .6475 | .2835 | |
| 435 | .3577 | .0496 | 1.7985 | 635 | .5351 | .2283 | |
| 440 | .3837 | .0621 | 1.9673 | 640 | .4316 | .1798 | |
| 445 | .3867 | .0747 | 2.0273 | 645 | .3437 | .1402 | |
| 450 | .3707 | .0896 | 1.9948 | 650 | .2683 | .1076 | |
| 455 | .3430 | .1063 | 1.9007 | 655 | .2043 | .0812 | |
| 460 | .3023 | .1282 | 1.7454 | 660 | .1526 | .0603 | |
| 465 | .2541 | .1528 | 1.5549 | 665 | .1122 | .0441 | |
| 470 | .1956 | .1852 | 1.3176 | 670 | .0813 | .0318 | |
| 475 | .1323 | .2199 | 1.0302 | 675 | .0579 | .0226 | |
| 480 | .0805 | .2536 | 0.7721 | 680 | .0409 | .0159 | |
| 485 | .0411 | .2977 | .5701 | 685 | .0286 | .0111 | |
| 490 | .0162 | .3391 | .4153 | 690 | .0199 | .0077 | |
| 495 | .0051 | .3954 | .3024 | 695 | .0138 | .0054 | |
| 500 | .0038 | .4608 | .2185 | 700 | .0096 | .0037 | |
| 505 | .0154 | .5314 | .1592 | 705 | .0066 | .0026 | |
| 510 | .0375 | .6067 | .1120 | 710 | .0046 | .0018 | |
| 515 | .0714 | .6857 | .0822 | 715 | .0031 | .0012 | |
| 520 | .1177 | .7618 | .0607 | 720 | .0022 | .0008 | |
| 525 | .1730 | .8233 | .0431 | 725 | .0015 | .0006 | |
| 530 | .2365 | .8752 | .0305 | 730 | .0010 | .0004 | |
| 535 | .3042 | .9238 | .0206 | 735 | .0007 | .0003 | |
| 540 | .3768 | .9620 | .0137 | 740 | .0005 | .0002 | |
| 545 | .4516 | .9822 | .0079 | 745 | .0004 | .0001 | |
| 550 | .5298 | .9918 | .0040 | 750 | .0003 | .0001 | |
| 555 | .6161 | .9991 | .0011 | 755 | .0002 | .0001 | |
| 560 | .7052 | .9973 | .0000 | 760 | .0001 | .0000 | |
| 565 | .7938 | .9824 | | 765 | .0001 | | |
| 570 | .8787 | .9555 | | 770 | .0001 | | |
| 575 | 0.9512 | .9152 | | 775 | .0000 | | |
| 580 | 1.0142 | .8689 | | 780 | .0000 | | |
| | | | | TOTALS: | 23.3294 | 23.3323 | 23.3343 |

OPTICAL PROJECTION APPARATUS, TRANSMISSION TYPE SCREEN, AND PROJECTION TYPE IMAGE DISPLAY APPARATUS

CROSS REFERENCE TO RELATED APPLICATION

This is a continuation of U.S. application Ser. No. 09/484,525, filed Jan. 18, 2000, now U.S. Pat. No. 6,573,950, the subject matter of which is incorporated by reference herein.

BACKGROUND OF THE INVENTION

The present invention relates to a projection type image display apparatus of the type which is used as a projection TV set, etc., in which white light from a light source is separated into additive primary colors, each of the primary colors is modulated with the use of a display element, and images are expanded and displayed on a screen.

Along with a diversity of video sources, projection type image display apparatuses are popular as optical projection apparatuses for a large screen as a result of its marketable properties, such as lightness in weight, low price, and compactness in size. In particular, the projection type image display apparatuses using a liquid crystal display element (hereafter, referred to as a liquid crystal panel) as a video generation source has come onto the market because of recent significant improvement of the definition and numerical aperture of a liquid crystal panel. Unlike the conventional projection type CRT, the liquid crystal panel does not emit light by itself, so it needs a light source. The projection type image display apparatus with a liquid crystal panel is composed so that a white light from its white light source is separated into additive primary colors and each of those primary colors are modulated in the liquid crystal panel, from which full-color images are displayed on the screen by expanding original images on the liquid crystal panel through a projection lens unit.

The optical system of the projection type image display apparatus that employs this liquid crystal panel is divided into two types, i.e. a three-panel type that uses three liquid crystal panels and a single-panel type that uses only one liquid crystal panel.

The three-panel type optical system has a liquid crystal panel and an optical unit (color separator) for each respective color of the primary colors (red, green, and blue) obtained by separating white light. The optical unit (color separator) propagates one of the obtained primary colors and the liquid crystal panel modulates the intensity of the colored light to form an image. Each color image is superposed with the other color images optically (color synthesizer) so as to display an image in full colors. This three-panel configuration of the optical system has advantages in that the light from the white light source can be used effectively to obtain high purity colors. In spite of this, because the optical system requires both a color separator and a color synthesizer as described above, the number of parts is increased in the optical system and, accordingly, the cost becomes higher than that of the single-panel configuration.

On the other hand, the single-panel configuration of the optical system uses only one liquid crystal panel, and it is divided into two types according to how TFT apertures are disposed in itself; delta type and stripe type. In the early single-panel configuration, a color filter was used to separate a white color into additive primary colors, but the configuration was plagued with the problem in practical use that the color filter absorbed and reflected the light, thereby the usage efficiency of the light was lowered to about ⅓ that of the three-panel configuration.

In order to solve this problem, for example, the Japanese Patent Unexamined Publication No.4-60538 has disclosed a single-panel color liquid crystal display apparatus, which, as shown in FIG. 1 thereof, employs dichroic mirrors 4R, 4G, and 4B disposed in a fan-like pattern so as to separate white color light obtained from a white color light source 1 into red, green, and blue light fluxes, thereby improving the usage efficiency of the light.

In this apparatus, each of the light fluxes R, G, and B separated by the above dichroic mirrors 4R, 4G, and 4B is injected at a different angle from the others into a micro-lens array 10 disposed at the light source side of a liquid crystal display element 20 shown in FIG. 2 in the above-referenced publication.

Each light flux passing this micro-lens array 10 is distributed and irradiated at a liquid crystal site driven by a signal electrode to which a color signal corresponding to one of those light fluxes is applied. Consequently, the usage efficiency of the light is greatly improved, thereby obtaining brighter images than the liquid crystal display element that employs an absorption type color filter.

The official gazette of Japanese Patent Laid-Open No. 5-328805 has also disclosed a projection type color liquid crystal display apparatus that has improved color purity by minimizing the generation of stray lights by starting the separation of white color light into the additive primary colors at the long wavelength side so as to prevent color mixing caused by the angle dependency of the wavelength selection characteristics of each of the dichroic mirrors. According to this method, because the original light is separated into light fluxes in the order of R, G, and B, thereby shifting the characteristics of each dichroic mirror, stray lights are not generated easily and the color purity of each separated light flux is improved. Images can thus be projected at a wide range of color reproduction.

However, in the technique disclosed in the above-referenced publication where the angle $\alpha$ is obtained when the G light flux is injected at an angle close to the normal of the liquid crystal display element, as shown in FIG. 6(*a*) thereof, and is diffracted by a micro-lens and the angle $\beta$ is obtained when each of the R and B light fluxes is injected obliquely to the normal of the liquid crystal display element, as shown in FIG. 6(*b*) thereof, and is diffracted by a micro-lens; the angle $\beta$ is larger than the angle $\alpha$ of the light flux (G) irradiated from the liquid crystal display element. This requires a large diameter (low F value) projection lens, thus becoming a primary factor for increasing the manufacturing cost of the projection type color display apparatus.

In order to solve this problem, the Japanese Patent Unexamined Publication No. 8-114780 disclosed a method for keeping a favorable white balance with the use of a small diameter projection lens by injecting a color light emitted from the light source with the weakest spectrum at an angle close to the normal of the liquid crystal display element, thereby eliminating the eclipse at the pupil of the projection lens with the least volume color light.

Because the purity of the color light with the least light volume is improved, it is possible to obtain a wider color reproduction range and more clear images. One of the projection lenses used for the optical system of the projection type image display apparatus described above is a retrofocus lens of the type disclosed, for example, in the Japanese Patent Unexamined Publication No. 9-96759.

(Because of the long flange back, it is the most suitable for the three-panel configuration of the optical system.) Because the half-angle of view of this projection lens is about 42°, the projection distance is short. If it is employed for a back-projection type image display apparatus, therefore, the arrangement will be more compact in size even when only one reflection mirror is employed.

Generally, the transmission type screen used in this case employs a two-panel configuration consisting of a lenticular sheet and a Fresnel lens sheet. In some cases, the transmission type screen is also provided with a lenticular lens on the image light injection surface of the Fresnel lens sheet so that the lenticular lens is shaped so as to be longer in the horizontal direction of the screen.

However, in the single-panel configuration described above it is difficult to obtain a predetermined purity for each color. Only with the means proposed in the Japanese Patent Unexamined Publication No. 8-114780. This is because, according to this method, each of the R, G, and B light fluxes separated by a dichroic mirror is injected at a different angle from the others into the micro-lens array 7 disposed at the light source side of the liquid crystal display element shown in FIG. 7 thereof. Each light flux passing this micro-lens array 7 is distributed and irradiated on the liquid crystal sites 24G, 24R, and 24B driven by a signal electrode respectively to which a color signal corresponding to each color light flux is applied independently. At this time, each junction between those micro-lenses provided at the micro-lens array 7 is not formed sharply, thereby it disperses the light. Consequently, for example, part of the green light flux, whose relative visibility is the highest and whose emission spectrum from the light source is dispersed at the junction, is then mixed into the red light flux whose emission spectrum from the light source is the weakest. Thus, the red color purity is lowered at the liquid crystal site 24R due to the mixture of the red light flux and the green light flux. The liquid crystal site 24R is originally injected only with the red light. This is why each color purity cannot reach its predetermined value with the above method.

If the reflection characteristics of the dichroic mirror for separating the red color are set so as to improve the purity thereof, however, the light volume of the red light flux to be obtained is reduced, thereby the white balance obtained by adding the three primary colors is lost.

At this time, if the white balance is adjusted by reducing the light volume of each of the other two color lights, then the luminance of the white video obtained by adding the three primary colors is lowered.

As described above, even in the case of the projection type color liquid crystal display apparatus proposed in the Japanese Patent Unexamined Publication No. 8-114780, both the brightness and the color purity are not able to reach satisfactory levels when compared with those of the projection type display apparatus that employs a conventional projection type CRT. In addition, because the luminance level is high when images are displayed in black on the liquid crystal panel, the contrast of the images becomes unfavorably low.

On the other hand, in order to realize a compact rear projection type image display apparatus for general home use, the projection distance (distance between the projection lens unit and the screen) must be reduced. Thus, a wider projection lens unit is required. At this time, if an ordinary wide projection lens unit is used for the apparatus, the peripheral light volume ratio is reduced significantly due to the light distribution characteristics of the liquid crystal panel. This is because the spectrum transmittance and reflectance of each of the three dichroic mirrors disposed between the liquid crystal panel and the white light source differs among injection angles of the light, so that the light flux from the white light source is injected into each dichroic mirror and the liquid crystal panel. As a result, the main light beam injected into the projection lens unit from each object point of the liquid crystal panel goes approximately in parallel to the light axis of the projection lens unit and the distributed angle becomes proportional to the numerical aperture of the micro-lens. If a wider projection lens is employed for the optical system, then the light fluxes to be injected into the projection lens unit from around the liquid crystal panel is reduced extremely, thereby the peripheral portion of each expanded image on the screen becomes dark.

In addition to the problems described above, the above-mentioned method is also confronted with the following problems that must be solved. (1) Each image must be focused accurately in every corner. (The chromatic aberration of the magnification must also be reduced.) (2) The F value must be reduced so as to improve the brightness of the screen. (3) Because of the inability of convergence adjustment, the distortion must be reduced. (4) The reflection on the lens surface must be reduced, to the extent of suppressing the loss of brightness and securing the contrast property sufficiently.

As described above, the projection lens units proposed to data have many problems that must be solved. Actually, however, even the retrofocus lens proposed in the Japanese Patent Unexamined Publication No. 9-96759 cannot secure enough brightness because of the large F value (2.56) and the shorter projection distance while the half-angle of view is about 42°.

The conventional optical projection system that employs a liquid crystal panel is also provided with a normal white light source and a cooling fan for cooling the liquid crystal panel (including a polarizing plate). Consequently, the cost of the optical system is increased and the reduction of the blowing sound has been a problem that must be solved. In the case of the air-cooling method, it is difficult to cool down the polarizing plate satisfactorily. The polarizing plate is thus affected by the heat and experiences a change in physical properties, thereby deteriorating the polarization degree and the contrast.

On the other hand, the transmission type screen used for the apparatus is manufactured by the conventional technique proposed in the Japanese Patent Unexamined Publication No. 58-59436. According to the conventional technique, the lenticular lens disposed on the injection surface is part of an elliptic cylindrical surface and the ellipse is formed so that the long axis is assumed in the direction of thickness between the injection surface and the ejection surface, and one of the two focal points of the ellipse is positioned inside the substrate and the other focal point is positioned around the ejection surface. In addition, the eccentricity of the ellipse is selected so as to take an approximate inverse number of the refractivity of the base material.

As a result, if a light flux in parallel to the long axis of the ellipse is injected in the injection surface, the light beam goes into aberration entirely at the focus around the ejection surface, causing the light beam to be dispersed from this focal point in the horizontal direction of the screen.

On the other hand, the lenticular lens provided on the ejection surface has an elliptic cylindrical surface formed almost symmetrical to the elliptic cylinder on the injection surface. The actual lenticular lens sheet does not cause the light to be focused at a point, but is dispersed, since a dispersion material is mixed in the lens sheet, as shown in FIGS. 31 and 32 thereof. Consequently, it is impossible to increase the width of the light absorption layer in the horizontal direction of the screen by more than the width of the lenticular lens. The reflected light caused by an external light cannot be reduced and the reduction of the contrast cannot be suppressed within a fixed value.

SUMMARY OF THE INVENTION

The above descriptions can thus be summarized as follows. The rear projection type image display apparatus that employs a single-panel optical projection system is confronted with new problems that have never been found in the rear projection type image display apparatus that employs a conventional CRT. The problems are: (1) The focus property must be further improved. (2) The contrast property must be further improved. (3) The requirements of both color purity and brightness must be satisfied.

In order to solve the above first problem, the projection lens unit of the present invention is composed so that a plurality of lens elements for projecting an expanded image of light received from an image generation source on a screen are disposed along the light axis. In this regard, first to third lens groups are disposed in order from the screen side. The first lens group has a negative refractive power as a whole, the second lens group has a positive refractive power as a whole, and the third lens group has a negative refractive power as a whole and includes at least a lens element having a negative refractive power at its center portion and a positive refractive power at its peripheral portion. The first lens group is composed so as to include at least a meniscus lens provided with a convex surface facing the screen and having a negative refractive power. The second lens group may be composed so as to include at least a lens having a negative refractive power, which is obtained by combining a double-convex lens having the first Abbe number and a double-convex lens having the second Abbe number which is smaller than the first Abbe number. Furthermore, the second lens group also includes a lens element having a positive refractive power at its center portion including the light axis and having almost no refractive power at its peripheral portion away from the light axis in the radial direction or having a negative refractive power there.

The projection lens unit for achieving a first object of the present invention, as described above, comprises the first lens group having a negative refractive power, the second lens group having a positive refractive power, and the third lens group having a negative refractive power. Those three lens groups are disposed in order from the screen side. This configuration can obtain a flat surface for each image even when the angle of view is 80° or over, so images can be focused favorably in every corner. Furthermore, because the first and third lens groups having a negative refractive power respectively are disposed at both sides of the second lens group having a positive refractive power in this configuration, it is not only advantageous to correct the field curvature, but also effective to suppress the distortion of images.

The projection lens unit in the three-group configuration, however, comes to have a problem in that the first and third lens groups have large diameters, increasing the manufacturing cost. In order to avoid this problem, therefore, the projection lens unit of the present invention is provided with a lens which is aspheric in shape so as to have a negative refractive power (for dispersing) around the light axis and a positive refractive power at its peripheral portion. The lens is disposed in the third lens group, thereby suppressing the diameter of the lens while making effective use of the basic configuration described above.

The second lens group is provided with an aspheric lens having a positive refractive power (for condensing) around the light axis and a negative refractive power or almost no refractive power at its peripheral portion (for dispersing or almost no effect for dispersing). The second lens group is combined with the third lens group as described above, thereby having the optical system function as a beam expander (for changing the width of the light flux) which can compress each light flux from the liquid crystal panel in the axial direction of the light. As a result, the effective height of the object surface can be reduced, thereby making it easier to correct the aberration including the magnification color aberration.

Furthermore, the second method for achieving the above first object involves canceling of both single color aberration and magnification color aberration caused by the red and blue light fluxes by optimizing the refraction and dispersion of each lens element included in the second lens group. The projection lens unit in this configuration can secure a high focusing property and a sufficient peripheral light volume ratio. This is because the telecentric configuration is taken so that the main light beam goes almost in parallel to the light axis of the projection lens unit and the ejection pupil through which the light flux focused at the periphery of the screen passes becomes larger than the ejection pupil on the light axis.

It is thus clear that the light flux can be compressed in the radial direction of the light if an aspheric lens element, which has a negative refractive power around the light axis (for dispersing the light) and a positive refractive power at its peripheral portion (for condensing), is disposed at a position nearest to the liquid crystal panel. This effect can also be obtained with any device if its light flux ejected from the liquid crystal panel, which is an object point, is almost in parallel to the light axis. There is thus no need to use a lens unit provided with three lens groups disposed so as to nave a negative refractive power, a positive refractive power, and a negative refractive power in order from the screen side.

In other words, if a light flux is compressed so as to minimize the diameter of a lens in a projection type image display apparatus that employs a liquid crystal panel, it will be effective to dispose an aspheric lens element at a position nearest to the liquid crystal panel. The lens element should have a negative refractive power (for dispersing) around the light axis and a positive refractive power (for condensing) at its peripheral portion.

Furthermore, in order to focus images clearly at any part of the screen so as to obtain brighter images, the projection lens unit of the present invention provides an aspheric lens at a position where the light flux formed in the center of the screen is not overlapped with the light flux to be formed at the outermost periphery of the screen. A low-price plastic lens may be used as the aspheric lens if a mass production is possible for the lens. However, this plastic lens experiences a problem in that the refractive power is changed according to changes of the shape and refractivity due to temperature changes and moisture absorption. Accordingly, the focal point is changed and the focusing property is degraded. In order to avoid the problem, the present invention takes the following two measures for the configuration of the projection lens unit. (1) The thickness of the plastic lens is unified as much as possible, thereby reducing the change of the refractive power to be caused by changes of the shape and refractivity due to temperature changes and moisture absorption. (2) A plurality of plastic aspheric lenses are combined to counterbalance the variation of the refractive power which may occur in response to temperature and humidity changes caused by the change of the local shape of the plastic aspheric lens.

Furthermore, a third method for achieving the first object of the present invention makes it possible to improve the focusing property of the lens unit by devising a lighting system. The lighting system of the present invention separates white light into the additive primary color light fluxes in the order of red, blue, and green with the use of dichroic mirrors, then each of those light fluxes is injected into one and the same liquid crystal panel at an angle different from the others. Consequently, the three primary color light fluxes modulated by the liquid crystal panel are separated in the horizontal direction of the screen of the liquid crystal panel when passing through the injection pupil of the projection lens unit. This is why the dichroic mirrors are used to separate the white light flux into the three primary color light fluxes so that the blue light flux passes the center of the injection pupil. The blue light-flux has the largest color aberration which occurs when the flux passes around the injection pupil. In addition, the orientation (code) of the aberration to be caused by the red light flux is corrected so as to cancel the magnification color aberration (deviation of the focal point between green and red light fluxes).

Next, technical means for achieving the second object of the present invention will be described. In this case, it is premised that the technique employed for the projection lens unit of the present invention is also used here.

The second method is to reduce the reflection loss on both the lens element composing the projection lens unit and the screen by p-polarization of the light fluxes injected into the transmission type screen from the optical projection apparatus of the present invention.

The third method is to dispose dichroic mirrors for separating white light received from a white light source used in the lighting system into three primary color light fluxes, then injecting each of those light fluxes into the liquid crystal panel at an angle different from the others in the order of a dichroic mirror for transmitting cyan (blue and green), a dichroic mirror for transmitting yellow (green and red), and a dichroic mirror for transmitting red, disposed sequentially from the white light source side. At this time, both brightness and color purity are taken into consideration to determine the optimal value of the wavelength, which reaches not less than 50% of the reflectance of each dichroic mirror.

The fourth method is to increase only a predetermined component to deflect by about 50% by disposing a deflecting beam splitter between the white light source and the display element so as to combine polarized light fluxes. At this time, only the p-polarized wave components are taken out, thereby reducing the reflection loss in the multi-lens array composed of a plurality of lens elements. In addition, the dichroic mirrors described above and a light path reflection mirror are disposed at positions crossing the polarized beam splitter at right angles, respectively, so as to be p-polarized respectively. Consequently, the reflectance of the light path reflection mirror is increased and, accordingly, the brightness of the images is increased more.

The fifth method is to separate the white light flux to red, blue, and green light fluxes in the order of the weakness of the spectral energy distribution of the white light source when light fluxes separated by the respective lenses disposed in the first multi-lens array close to the white light source are expanded by a lens disposed so as to face the second multi-lens array positioned at the liquid crystal panel side, then the light fluxes are projected in the liquid crystal panel. As a result, the light path between the second multi-lens array and the liquid crystal panel makes the red light flux shortest, so the projection magnification of the red light flux is reduced, thereby the out-of-focus error caused by aberration occurs less and the energy density of the red light flux is increased.

Furthermore, because the blue light flux has a low relative visibility and the light path is provided with a filter for reflecting the ultraviolet ray output from the white light source in itself, the energy of the blue light flux used effectively is also reduced. This is why the blue light flux is separated from the white light flux just after the red light flux so that the blue light flux passes the center of the injection pupil of the projection lens unit as described above. The brightness of both white light and each of the three primary colors can thus be maximized when the three additive colors are displayed on the screen.

Furthermore, the first method for achieving the third object of the present invention described above is to provide the above projection type image display apparatus with a liquid crystal panel and a polarizing plate and to fill a cooling liquid in a space formed between the liquid crystal panel and a lens element of the projection lens unit, closest to the liquid crystal panel. The liquid crystal panel and the polarizing plate disposed in front of the liquid crystal panel change their physical characteristics due to a heat when the temperature rises (to 70° C. or so), causing the polarizing characteristics to be degraded, thereby to lower the contrast property in some cases. In the case of the configuration of the present invention, however, because the liquid crystal panel and the polarizing plate are cooled down by a liquid (cooling agent), the cooling efficiency is improved more than that of the air cooling method. Consequently, it is possible to prevent deterioration of the contrast property caused by the deterioration of the polarizing characteristics caused by a rise in temperature, thereby obtaining high quality images.

Furthermore, if a medium, whose refractivity to light having a 587.6 (nm) wavelength is 1.2 or over, is used as the above cooling liquid, then the reflection of the image light is further reduced, thus the contrast property is further improved. The second method of the present invention is to provide the lens tube of the projection lens unit with an aperture, which is structured so as to pass only a light flux modulated by the liquid crystal panel and used for forming the object image and blocking other light fluxes by absorbing them so they will not pass through the aperture. Consequently, those other light fluxes not used for forming the image do not reach the screen, thereby the contrast property of the image is further improved. Furthermore, the third method of the present invention is to provide the transmission screen with filtering characteristics for absorbing the green light emitted with the strongest spectrum from the white light source. Consequently, the screen is protected from deterioration of the contrast property of the projected images even when external lights are injected to the screen.

Finally, the first method for achieving the fourth object of the present invention is to dispose the above dichroic mirrors at optical positions orthogonal to the polarized beam splitter respectively so that the light is s-polarized to the dichroic mirrors. Consequently, the rising part of the spectral reflectivity characteristics of each dichroic mirror becomes sharp, thus each color purity is improved.

The second method for achieving the fourth object of the present invention is to separate the white light from the light source in the order of weakness (in order of red, blue, and green) in the spectral energy distribution of the white light source when each light flux separated by the corresponding lens provided in the first multi-lens array close to the white light source is expanded by a lens in the second multi-lens array, which is facing the first multi-lens array. The second multi-lens array is provided at the liquid crystal panel side so that each light flux is projected on the liquid crystal panel. Consequently, the red light flux takes the shortest way in the light path between the second multi-lens array and the liquid crystal panel, whereby the energy density of the red light flux becomes large and the color purity is improved. In addition, when the red light flux comes into the micro-lens array of the liquid crystal panel, the red light flux is not adjacent to the green light flux having the highest relative visibility and a strong emission spectrum from the light source in the same micro-lens array, part of the red light flux is dispersed at a joint between micro-lenses, so that the green light flux is not mixed easily with the red light flux having the weakest emission spectrum from the light source. The color purity is thus improved.

Furthermore, the third method for achieving the fourth object of the present invention is to reduce the ripple component of the spectral reflection factor characteristics of each dichroic mirror, thereby making it difficult to generate stray lights. Consequently, the color purity of each separated light flux is improved and images can be projected in a wider range of color reproduction.

Furthermore, none of light fluxes separated due to the improper profile irregularity at each joint of lenses provided in the first multi-lens array close to the white light source are able to enter the lenses of the second multi-lens array facing the first one provided at the liquid crystal panel side. Some of those light fluxes enter adjacent lenses. Consequently, none of expanded light fluxes enter the liquid crystal panel at a predetermined angle, thereby mixing with other colors. In addition, abnormal light is reflected on the side surfaces and/or the top and bottom surfaces of the optical projection apparatus and enters each of the dichroic mirrors. As a result, those reflected lights cause wavelength shifts, so that light fluxes other than a predetermined wavelength enter the liquid crystal panel, thereby deteriorating color purity. This is why the side surfaces, as well as the top and bottom surfaces of the optical projection apparatus are serrated, embossed or matted, thereby lowering the reflectivity thereof. In addition, a plurality of aperture diaphragms are provided at a place where light fluxes pass, thereby absorbing and blocking unnecessary light fluxes so as to reduce the amount of abnormal light fluxes which enter the dichroic mirrors and to suppress the deterioration of the color purity.

Furthermore, the fifth method for achieving the fourth object of the present invention is to provide the transmission type screen with filtering characteristics for absorbing the green light flux emitted with the strongest spectra from the white light source consequently, it is possible to reduce the green light having the strongest emission spectrum in which red and blue lights are mixed, thereby the color purity is improved for each of the other color lights.

BRIEF DESCRIPTION OF THE DRAWINGS

FIG. 29 is a table of spectrum three stimulus values in the 2-degree visual field.

FIG. 30 is a table of spectrum three stimulus values in the 10-degree visual field.

DESCRIPTION OF THE PREFERRED EMBODIMENTS

Hereunder, the preferred embodiments of the present invention will be described with reference to the accompanying drawings.

Figure 1:
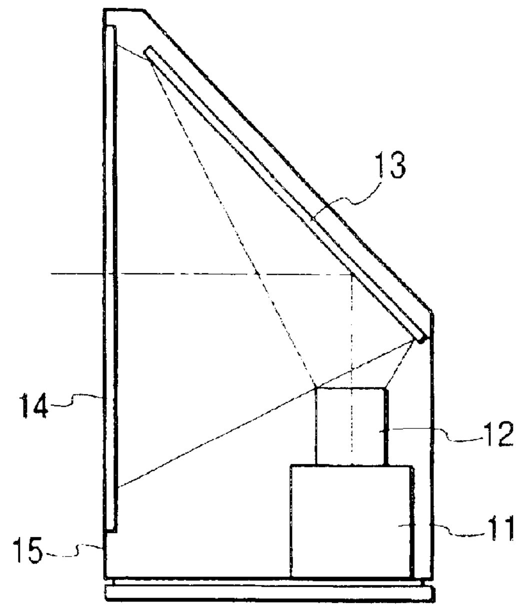
FIG. 1 is a cross sectional side view of the main portion of a rear side projection type image display apparatus for which an optical projection system in accordance with the present invention is employed.
Figure 2:
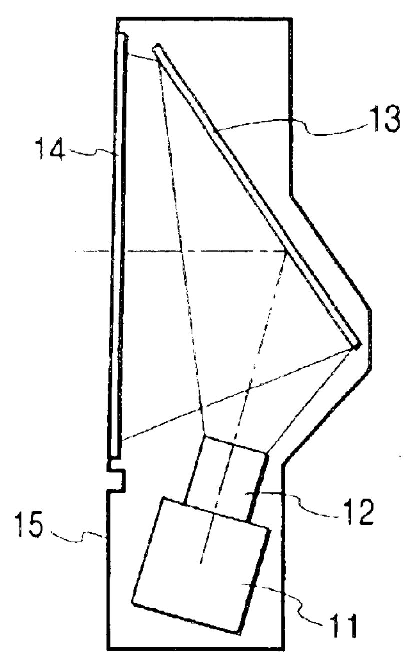
FIG. 2 is a cross sectional side view of the main portion of a rear side projection type image display apparatus for which an optical projection system in accordance with the present invention is employed.

FIGS. 1 and 2 show the overall configuration of different examples of a rear side projection type image display apparatus for which the optical system of the present invention to be described later is employed. FIGS. 1 and 2 are cross sectional views of the rear side projection type image display apparatus from the image viewing direction (image light ejecting direction) and from a side orthogonal to the horizontal direction.

Figure 11:
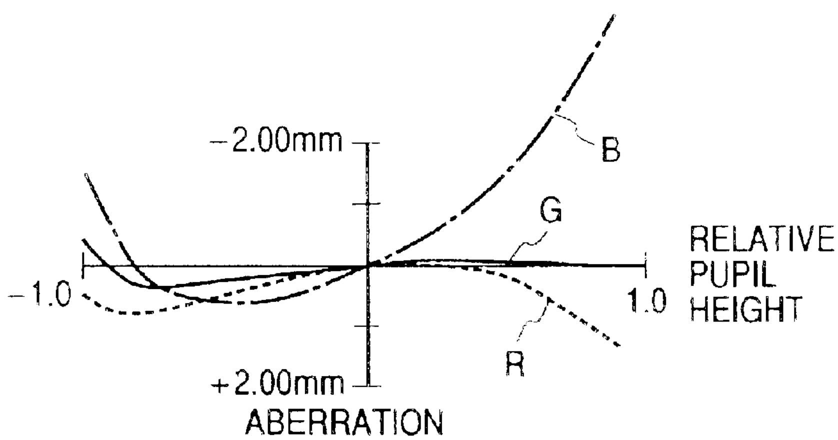
FIG. 11 is a characteristic chart for indicating the aberration in the projection lens unit of the present invention.

In FIGS. 1 and 2, 11 is an optical unit including a white light source and a liquid crystal panel. A light output from the optical unit 11 is expanded by a projection lens 12 connected to the optical unit 11. The expanded light from this projection lens 12 is reflected by a reflection mirror 13 at a predetermined angle so as to be projected on a screen 14 from the rear side thereof. Consequently, an image is displayed at the image viewing side of the screen 14. (The optical unit 11, the projection lens 12, and the reflection mirror 13 are housed in a cabinet 15. The screen 14 is disposed at the front side (image viewing side) of the cabinet 15. The term "various optical units" described above refers to the optical unit 11, the projection lens 12, the reflection lens 13, and the screen 14 in this embodiment, and the present invention has improved only the optical unit 11, the projection lens 12, and the screen 14 among those optical units.

In the rear side projection type image display apparatus shown in FIG. 2, the reflection angle set by the reflection mirror 13 for the expanded light from the projection lens 12 is reduced and the projection distance is shortened to reduce the set in depth more than that shown in FIG. 1. In the set shown in FIG. 2, the size in the vertical direction (height) is slightly extended more than that of the apparatus shown in FIG. 1. The optical unit of the present invention can apply to either of the apparatuses shown in FIGS. 1 and 2.

Figure 5:
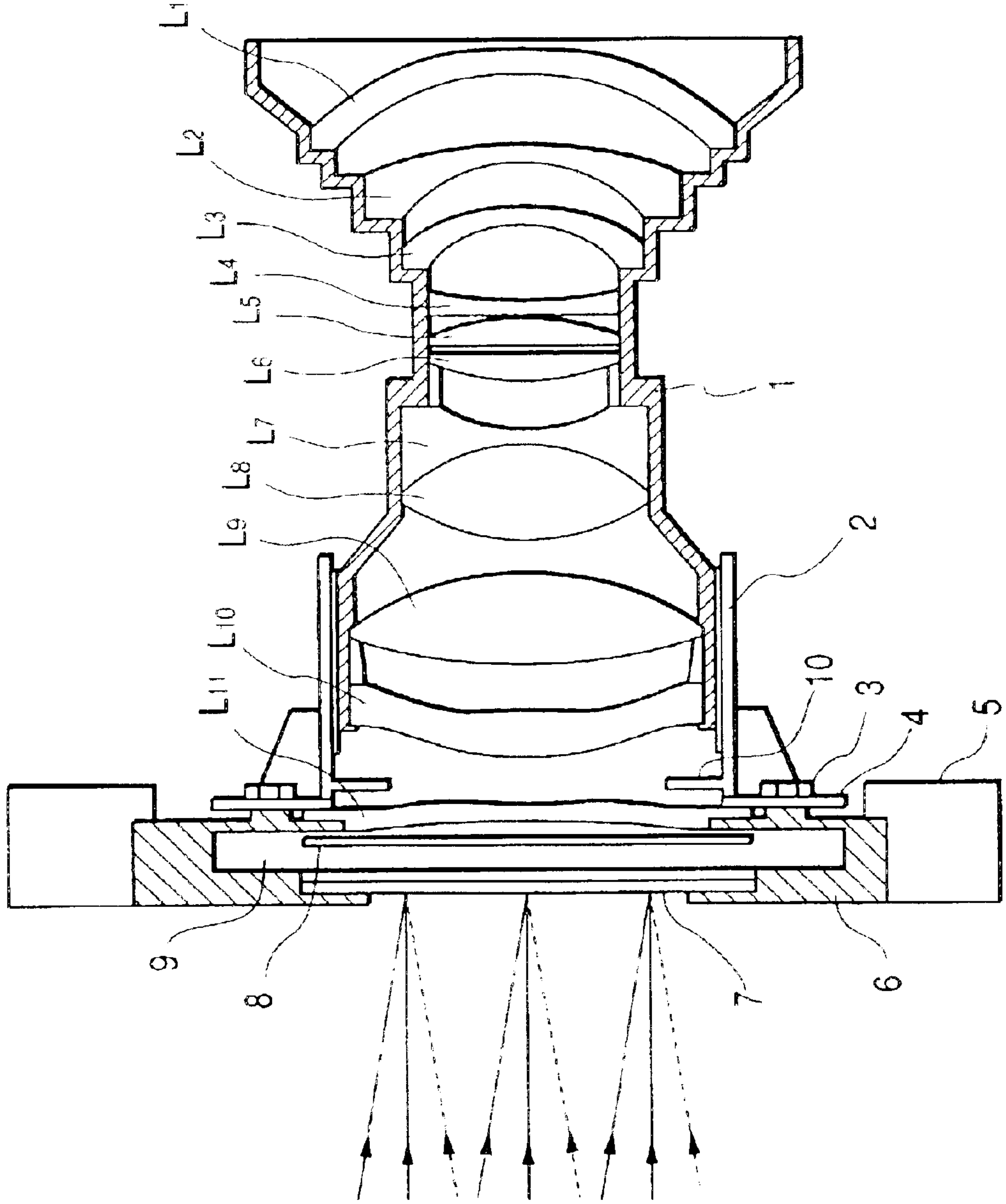
FIG. 5 is a cross sectional view of a projection lens unit of the present invention for showing the disposition of each lens therein.

At first, the projection lens 12 will be described in detail as an embodiment of the optical unit of the present invention. FIG. 5 is a cross sectional view of the main portion of the projection lens 12 according to an embodiment of the present invention. In FIG. 5, numeral 7 denotes a liquid crystal panel and 8 denotes a polarizing plate provided at the light ejection side. Numeral 9 denotes a cooling liquid and L11 denotes the 11th lens. L10 denotes the tenth lens, L9 denotes the ninth lens, L8 denotes the eighth lens, L7 denotes the seventh lens, L6 denotes the sixth lens, L5 denotes the fifth lens, L4 denotes the fourth lens, L3 denotes the third lens, L2 denotes the second lens, and L1 denotes the first lens.

The 11th lens L11 and the liquid crystal panel 7 are fixed to a bracket 6 via an O-ring. A polarizing plate 8 is disposed in a space formed after the 11th lens L11 and the liquid crystal panel 7 are fixed to the bracket 6. Then, a cooling liquid 9 is sealed in a space formed between the polarizing plate and the liquid crystal panel. This cooling liquid 9, which circulates, lowers and unifies the temperature between the liquid crystal panel and the polarizing plate heated by the injected light, then radiates the heat outside from the radiator plate 5 formed at the bracket 6. At this time, it is recommended to coat the light injection side of the liquid crystal panel 7 with a reflection preventive material so as to reduce the loss of the light caused by reflection on the injection side surface. (The polarizing plate provided at the light injection side is not illustrated.)

The first to fourth lenses have a negative refractive power respectively and they are combined to form the first lens group. The fifth to tenth lenses are combined to form the second lens group so as to be in charge of part of the positive refractive power of the whole projection lens unit. (However, the combined refractive power of a lens (obtained by laminating the seventh and eighth lenses) provided to reduce the color aberration on the axis takes a negative value.) The first and second lens groups are built in the internal mirror tube 1 and fixed to the external mirror tube 2 with screws (not illustrated). In addition, this external mirror tube 2 is fixed to the bracket 6 with screws (not illustrated) via a plate 4. An image on the liquid crystal panel, which is the object surface, is expanded and projected on the screen (not illustrated).

The eleventh lens L11, the polarizing plate 8, the cooling liquid 9, and the liquid crystal panel 7 are all taken into consideration to calculate the focal point of the third lens group.

Figure 6:
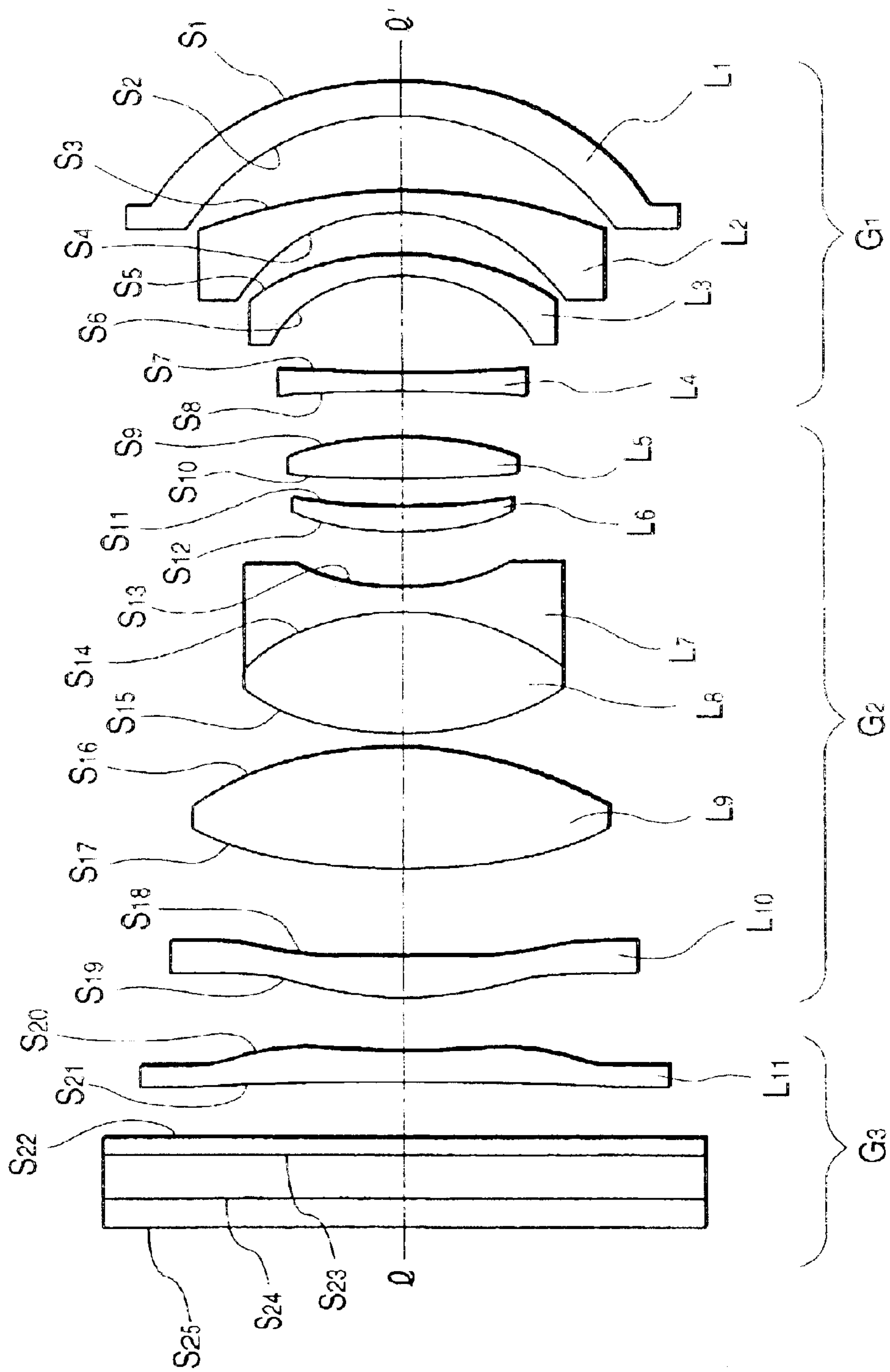
FIG. 6 is a cross sectional view of the projection lens unit of the present invention for showing the disposition of each lens therein.
Figure 7:
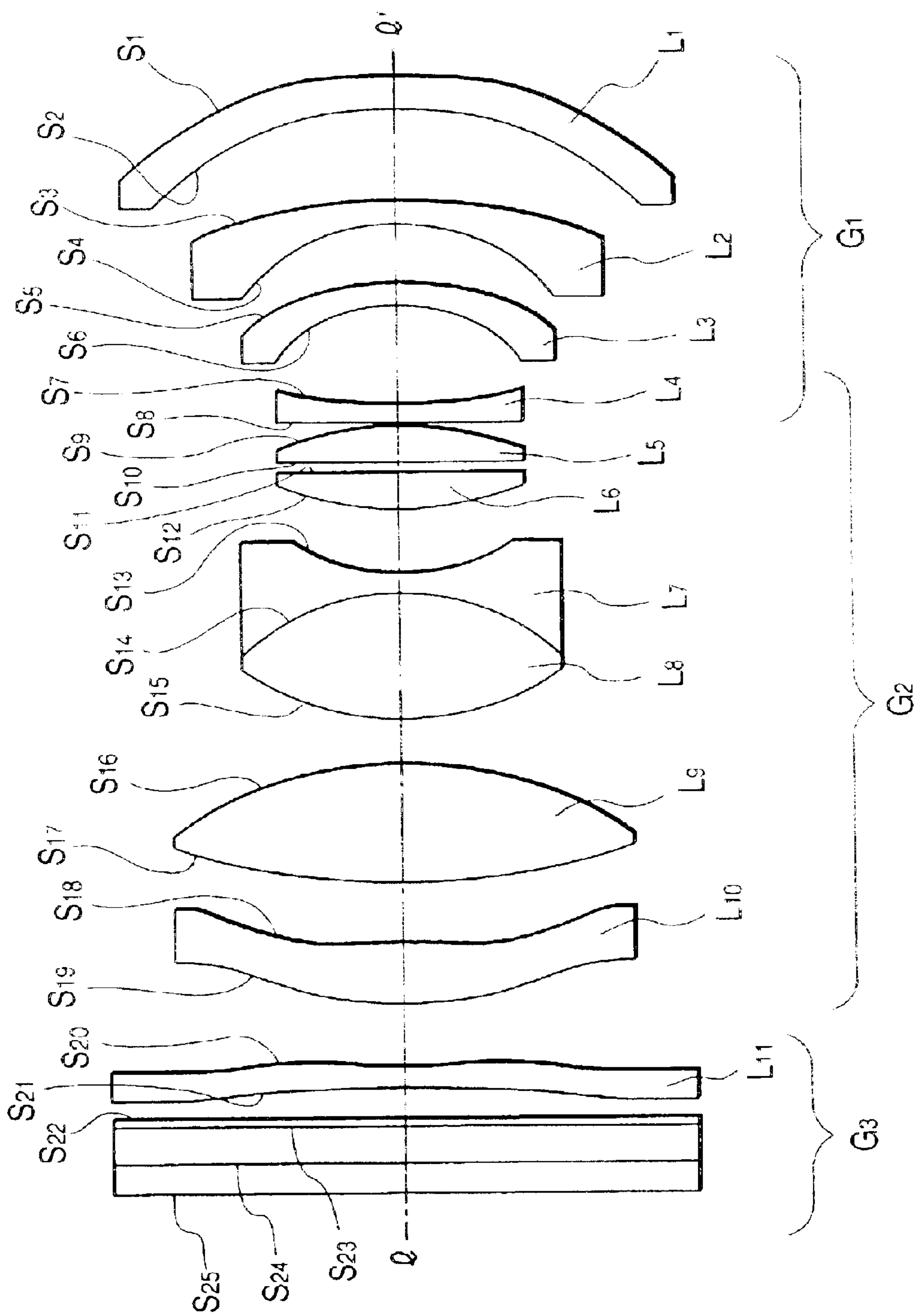
FIG. 7 is a cross sectional view of the projection lens unit of the present invention for showing the disposition of each lens therein.

FIG. 6 shows a configuration of the projection lens unit for the disposition of each lens therein as an embodiment of the present invention. Table 1 shows concrete lens data. FIG. 7 shows a configuration of the projection lens unit for the disposition of each lens therein as another embodiment of the present invention. Table 3 shows concrete lens data. FIGS. 6 and 7, which show dispositions of the lenses in the projection lens unit, do not include other members of the lens tube. The projection lens unit in the embodiments of the present invention is composed so as to obtain the optimal performance when an image displayed on a 1.6-inch liquid crystal panel is expanded and projected on a 50-inch screen. The half-angle of the projection lens is as wide as 44.3 degrees.

Consequently, only one reflection 13 will be sufficient to realize an apparatus of reduced height as shown in FIG. 1, as well as the apparatus of reduced depth as shown in FIG. 2.

Tables 1 to 3 show concrete lens data available for the projection lens unit of the present invention.

TABLE 1

| Lens | Surface No. | Curvature Radius | Surface Pitch(mm) | Refractivity(555 nm)/ Abbe Number(vd) |
|---|---|---|---|---|
| Screen | | ∞ | 650 | 1.0 |
| 1st lens | $S_1$ | −57.14 | 4.55 | 1.49291/58.0 |
| | $S_2$ | −37.00 | 10.143 | 1.0 |
| 2nd lens | $S_3$ | −75.00 | 3.00 | 1.51827/64.2 |
| | $S_4$ | −26.00 | 5.70 | 1.0 |
| 3rd lens | $s_5$ | −36.210 | 3.00 | 1.51827/64.2 |
| | $S_6$ | −21.300 | 13.30 | 1.0 |
| 4th lens | $S_7$ | 325.87 | 2.70 | 1.51827/64.2 |
| | $S_8$ | −480.00 | 6.69 | 1.0 |
| 5th lens | $S_9$ | −46.195 | 5.70 | 1.81087/25.5 |
| | $S_{10}$ | 180.00 | 3.40 | 1.0 |
| 6th lens | $S_{11}$ | 79.108 | 3.50 | 1.83853/43.0 |
| | $S_{12}$ | 42.223 | 8.711 | 1.0 |
| 7th lens | $S_{13}$ | 30.00 | 3.00 | 1.85306/23.8 |
| 8th lens | $S_{14}$ | −31.070 | 17.00 | 1.69910/55.5 |
| | $S_{15}$ | 45.587 | 1.4614 | 1.0 |
| 9th lens | $S_{16}$ | −52.183 | 18.00 | 1.62229/60.3 |
| | $S_{17}$ | 87.592 | 12.604 | 1.0 |
| 10th lens | $S_{18}$ | −175.00 | 5.70 | 1.49291/58.0 |
| | $S_{19}$ | 39.235 | 6.6893 | 1.0 |
| 11th lens | $S_{20}$ | 70.000 | 5.100 | 1.49291/58.0 |
| | $S_{21}$ | −500.0 | | |
| Cooling liquid | $S_{22}$ | ∞ | 8.00 | 1.44671 |
| Polarizing plate | $S_{23}$ | ∞ | 1.60 | 1.51827 |
| Cooling liquid | $S_{24}$ | ∞ | 6.00 | 1.44671 |
| Panel | $S_{25}$ | ∞ | 4.10 | 1.46579 |

(Aspheric surface data)

| Surface No. | CC | AE | AF | AG | AH |
|---|---|---|---|---|---|
| $S_1$ | 1.66671 | −9.056717E-6 | 6.141192E-9 | −1.298421E-12 | −7.969922E-16 |
| $S_2$ | 0.50000 | −9.701383E-6 | 4.700787E-9 | 1.107547E-11 | −8.904763E-15 |
| $S_{18}$ | −45.3169 | 1.7912986E-5 | −2.3356823E-9 | −5.267746E-11 | 5.079977E-14 |
| $S_{19}$ | 0.598261 | −1.267814E-5 | −2.0820712E-9 | −2.594471E-11 | 1.146374E-14 |
| $S_{20}$ | 4.485518 | −3.756551E-5 | 4.0091649E-8 | −2.422088E-11 | −3.862568E-16 |

TABLE 2

| Lens | Surface No. | Curvature Radius | Surface Pitch(mm) | Refractivity(555 nm)/ Abbe Number(vd) |
|---|---|---|---|---|
| Screen | | ∞ | 650 | 1.0 |
| 1st lens | $S_1$ | −63.775 | 4.55 | 1.49291/58.0 |
| | $S_2$ | −39.746 | 10.143 | 1.0 |
| 2nd lens | $S_3$ | −70.00 | 3.00 | 1.51827/64.2 |
| | $S_4$ | −24.50 | 5.70 | 1.0 |
| 3rd lens | $S_5$ | −34.000 | 3.00 | 1.51827/64.2 |
| | $S_6$ | −21.300 | 13.30 | 1.0 |
| 4th lens | $S_7$ | 340.06 | 2.70 | 1.51827/64.2 |
| | $S_8$ | −480.00 | 6.69 | 1.0 |
| 5th lens | $S_9$ | −46.195 | 5.70 | 1.81087/25.5 |
| | $S_{10}$ | 180.00 | 3.40 | 1.0 |
| 6th lens | $S_{11}$ | 79.102 | 3.50 | 1.83853/43.0 |
| | $S_{12}$ | 42.089 | 8.711 | 1.0 |
| 7th lens | $S_{13}$ | 30.00 | 3.00 | 1.85306/23.8 |
| 8th lens | $S_{14}$ | −31.070 | 17.00 | 1.69910/55.5 |
| | $S_{15}$ | 45.587 | 2.66 | 1.0 |
| 9th lens | $S_{16}$ | −51.378 | 16.00 | 1.62229/60.3 |
| | $S_{17}$ | 87.592 | 12.604 | 1.0 |
| 10th lens | $S_{18}$ | −175.00 | 5.70 | 1.49291/58.0 |
| | $S_{19}$ | 41.494 | 6.9564 | 1.0 |
| 11th lens | $S_{20}$ | 70.000 | 4.600 | 1.49291/58.0 |
| | $S_{21}$ | −500.0 | | |
| Cooling liquid | $S_{22}$ | ∞ | 8.00 | 1.44671 |

TABLE 2-continued

| | | | | |
|---|---|---|---|---|
| Polarizing plate | $S_{23}$ | ∞ | 1.60 | 1.51827 |
| Cooling liquid | $S_{24}$ | ∞ | 6.00 | 1.44671 |
| Panel | $S_{25}$ | ∞ | 4.10 | 1.46579 |

(Aspheric surface data)

| Surface No. | CC | AE | AF | AG | AH |
|---|---|---|---|---|---|
| $S_1$ | 1.91069 | −9.921107E-6 | 9.719141E-9 | −6.886507E-12 | 2.390934E-15 |
| $S_2$ | 0.50000 | −1.070129E-5 | 1.190249E-8 | −4.450229E-12 | 2.351065E-15 |
| $S_{18}$ | −32.4986 | 1.806376E-5 | 2.075073E-8 | −1.004275E-10 | 8.048705E-14 |
| $S_{19}$ | 1.158486 | −1.009448E-5 | 1.027012E-8 | −5.664122E-11 | 3.051688E-14 |
| $S_{20}$ | 4.133819 | −3.374035E-5 | 2.746039E-8 | −3.157388E-12 | −1.159482E-14 |

TABLE 3

| Lens | Surface No. | Curvature Radius | Surface Pitch(mm) | Refractivity(555 nm)/ Abbe Number(vd) |
|---|---|---|---|---|
| Screen | | ∞ | 650 | 1.0 |
| 1st lens | $S_1$ | −66.415 | 4.55 | 1.49291/58.0 |
| | $S_2$ | −38.000 | 11.140 | 1.0 |
| 2nd lens | $S_3$ | −75.00 | 3.00 | 1.51827/64.2 |
| | $S_4$ | −25.840 | 6.15 | 1.0 |
| 3rd lens | $S_5$ | −36.210 | 3.00 | 1.51827/64.2 |
| | $S_6$ | −20.500 | 11.51 | 1.0 |
| 4th lens | $S_7$ | 88.188 | 2.70 | 1.51827/64.2 |
| | $S_8$ | −3000.0 | 0.16 | 1.0 |
| 5th lens | $S_9$ | −42.910 | 5.70 | 1.85306/23.8 |
| | $S_{10}$ | 483.00 | 3.30 | 1.0 |
| 6th lens | $S_{11}$ | 284.78 | 3.50 | 1.83805/37.3 |
| | $S_{12}$ | 40.350 | 8.420 | 1.0 |
| 7th lens | $S_{13}$ | 25.614 | 3.00 | 1.85306/23.8 |
| 8th lens | $S_{14}$ | −31.070 | 18.50 | 1.69910/55.5 |
| | $S_{15}$ | 34.944 | 10.0 | 1.0 |
| 9th lens | $S_{16}$ | −52.480 | 18.00 | 1.62229/60.3 |
| | $S_{17}$ | 95.000 | 10.800 | 1.0 |
| 10th lens | $S_{18}$ | −234.02 | 5.70 | 1.49291/58.0 |
| | $S_{19}$ | 41.086 | 6.86 | 1.0 |
| 11th lens | $S_{20}$ | 70.000 | 3.300 | 1.49291/58.0 |
| | $S_{21}$ | −500.0 | | |
| Cooling liquid | $S_{22}$ | ∞ | 6.500 | 1.44671 |
| Polarizing plate | $S_{23}$ | ∞ | 1.60 | 1.51827 |
| Cooling liquid | $S_{24}$ | ∞ | 6.00 | 1.44671 |
| Panel | $S_{25}$ | ∞ | 4.10 | 1.46579 |

(Aspheric surface data)

| Surface No. | CC | AE | AF | AG | AH |
|---|---|---|---|---|---|
| $S_1$ | −1.65759 | −4.185486E-6 | −1.388992E-8 | 2.662426E-11 | −1.585180E-14 |
| $S_2$ | 1.25000 | 1.806825E-6 | −3.234478E-8 | 8.178348E-11 | −5.098478E-14 |
| $S_{18}$ | −174.7652 | 1.276181E-5 | −2.845374E-8 | 6.605380E-11 | −4.037350E-14 |
| $S_{19}$ | 0.3875325 | −1.920221E-5 | −5.634405E-9 | 5.572927E-11 | −3.864189E-14 |
| $S_{20}$ | 3.5862026 | −4.614361E-5 | 9.109874E-8 | −1.133869E-10 | 8.206802E-14 |

Next, how to read the above lens data will be described with reference to Table 1 and FIG. 6. Table 1 shows data divided into spherical surface data with respect to the lens areas mainly around the light axis and aspheric surface data with respect to the outer peripheral portion of the spherical surface. At first, Table 1 shows that the radius of curvature of the screen is limitless (that is, a flat surface) and the distance on the light axis (surface pitch) between the screen to the surface S1 of the first lens L1 of the first lens group is 650 mm, and the refractivity of the medium between those items is 1.0. Table 1 also shows that the radius of curvature of the lens surface S1 is −57.14 mm (if the radius of curvature is at the screen side, the sign is positive, that is, the center of curvature is at the liquid crystal side in this case) and the distance on the light axis between the lens surface S1 and the lens surface S2 is 4.55 mm and the refractivity of the medium between those lens surfaces is 1.49291. In the same way, Table 1 shows that the radius of curvature of the surface S25 is limitless (that is, flat surface) and the panel thickness is 4.1 mm, and the refractivity is 1.46624.

An aspheric surface coefficient is shown for each of the lens surfaces S1 and S2 of the first lens L1 of the first lens group G1, the lens surfaces S18 and S19 of the tenth lens L10 of the second lens group G2, and the lens surface S20 of the eleventh lens L11 of the third lens group G3 respectively. An aspheric surface coefficient is a coefficient taken when a lens shape is represented by the following expression.

$$Z(r) = \frac{(r^2/RD)}{1+\sqrt{1-(1+CC)r^2/RD}} + AE\cdot r^4 + AF\cdot r^6 + AG\cdot r^8 + AH\cdot r^{10} + \cdots + A\cdot r^{2n} \quad \text{[Expression 1]}$$

However, RD, CC, AE, AF, AG, AH, . . . , A

A: Any constant n: Any natural number

Figure 8:
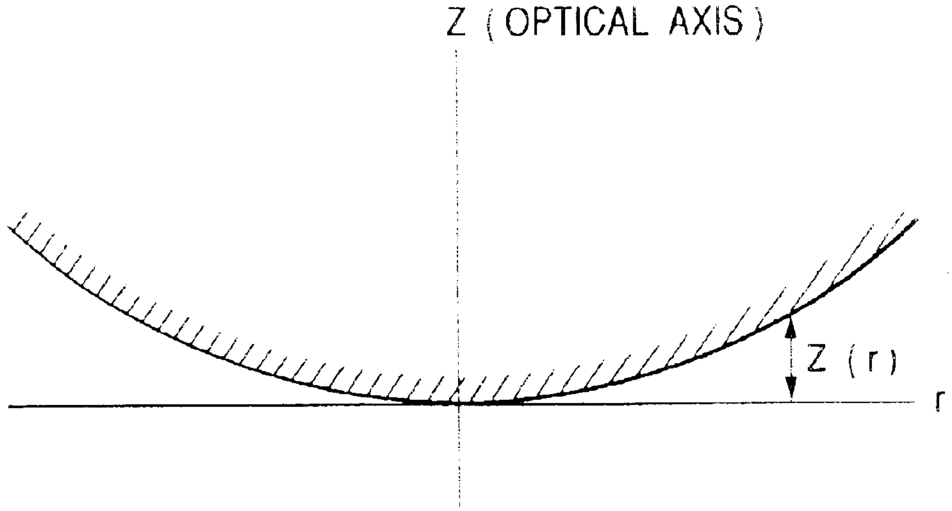
FIG. 8 is a diagram used for describing the definition of a lens shape.

In the expression 1, Z(r) indicates the height of the object lens when the Z axis is assigned for the axial direction of the light towards the screen from the video generation source and the r axis is assigned for the radius direction of the lens as shown in FIG. 8 for defining the lens shape. The component r indicates a direction in the radius direction and RD indicates a radius of curvature. Consequently, if such coefficients as CC, AE, AF, AG, AH, etc. are given, the lens surface height, that is, the lens shape is determined according to the above expression 1.

This completes the description of how to read the data in a Table. Tables 2 and 3 show data corresponding to other embodiments. Table 4 shows the focal points of the lens elements provided in the projection lens unit of the present invention, shown in Tables 1 to 3, and Abbe numbers collectively.

invention, the distortion of images is 0.5% or under. The projection lens unit of the present invention is composed so as to make the convex side of each of the first, second, and third lenses L1 to L3 of the first lens group face the screen side, thereby letting those lenses function as negative meniscus lenses so as to suppress the generation of aberration and correct the curvature of each image. In particular, a plastic aspheric lens is used as the first lens L1 through which the light flux from the object point P0 on the axis and the light flux from the object point P1 at the outermost periphery of the screen pass in completely different portions, so that coma aberration and astigmatism are corrected very accurately without affecting the aberration on the axis adversely. In addition, each lens is unified in thickness as much as possible, so that the lens is protected from the variation of the refractive power to be caused by changes of both shape and refractivity of the lens due to temperature changes and moisture absorption peculiar to plastic lenses. In addition, the fourth lens L4 also takes charge of part of correction of spherical aberration, curvature of images, and coma aberration. The fourth lens L4 is disposed close to a place where the light flux from the object point PO on the axis is spread most widely.

The second lens group is in charge of the positive refractive power of the whole projection lens unit. In the case of the projection lens unit, the fifth lens L5 is composed of a highly dispersed material whose Abbe number is 30 or under and has a positive refractive power. The sixth lens L6 is also composed of a highly dispersed material whose Abbe number is 45 or under and has a positive refractive power. Each of those lenses L5 and L6 is composed of a highly refractive

TABLE 4

| | Data in Table 1 | | Data in Table 2 | | Data in Table 3 | |
|---|---|---|---|---|---|---|
| Lens | Focal point (mm) | Abbe number | Focal point (mm) | Abbe number | Focal point (mm) | Abbe number |
| 1st lens | −230.13 | 58.0 | −228.28 | 58.0 | −190.25 | 58.0 |
| 2nd lens | −78.425 | 64.2 | −74.402 | 64.2 | −77.683 | 64.2 |
| 3rd lens | −107.17 | 64.2 | −119.68 | 64.2 | −97.527 | 64.2 |
| 4th lens | −374.09 | 64.2 | −383.62 | 64.2 | −165.25 | 64.2 |
| 5th lens | 45.852 | 25.5 | 45.852 | 25.5 | 46.429 | 23.8 |
| 6th lens | 103.51 | 43.0 | 102.84 | 43.0 | 55.732 | 37.3 |
| 7th lens | −29.740 | 23.8 | −29.745 | 23.8 | −25.956 | 23.8 |
| 8th lens | 166.34 | 55.5 | 166.34 | 55.5 | 114.88 | 55.5 |
| 9th lens | 55.281 | 60.3 | 54.443 | 60.3 | 56.992 | 60.3 |
| 10th lens | 65.596 | 58.0 | 68.643 | 58.0 | 71.393 | 58.0 |
| 11th lens | −140.13 | 58.0 | −140.13 | 58.0 | −140.14 | 58.0 |
| Combination of the 7th and 8th lenses | −80.522 | | −80.522 | | −110.503 | |
| Full system | 21.740 | | 21.737 | | | 21.859 |

Next, the function of each lens group of the projection lens unit of the present invention will be described.

The projection lens unit of the present invention is composed so that the first lens group has a negative refractive power and the second lens group has a positive refractive power as shown in FIGS. 5 through 7.

Consequently, in the embodiments of the present invention, flat images can be obtained even at an image angle as wide as almost 90°, so that each image is focused favorably in every corner. In addition, because the first and third lens groups having a negative refractive power respectively are disposed at both sides of the second lens group having a positive refractive power, the configuration is also effective to reduce the distortion appearing in the configuration of those lenses. In the embodiments of the present material whose refractivity is 1.8 or over and has a positive refractive power. Each of those lenses L5 and L6 satisfies the achromatic condition and controls the height of the light beam passing therethrough and the height of the light flux which enters to the first lens group, thereby reducing the magnification color aberration.

The seventh lens L7 is composed of a highly dispersed material whose Abbe number is 25 or under, and the eighth lens L8 is composed of a low dispersed material whose Abbe number is 50 or over, thereby reducing the color aberration only on the axis.

The ninth lens L9 is composed of a low dispersed material whose Abbe number is 60.3. It is a double-convex lens and is in charge of part of the positive refractive power of the whole projection lens unit.

The tenth lens L10 is a plastic lens and is in charge of part of the positive refractive power of the whole projection lens unit. Just like the first lens L1, the tenth lens L10 is also disposed at a place where the light flux from the object point P0 on the axis and the light flux from the object point P1 at the outermost periphery of the screen pass through different points and the lens L10 is composed so as to become aspheric on the lens surfaces S18 and S19. Consequently, the tenth lens L10 can correct both aberration on the axis, as well as the high-order coma aberration, and astigmatism off the axis.

The eleventh lens L11 of the third lens group G3 is a plastic lens and is composed so as to be aspheric and let the lens surface S20 have a negative refractive power (for radiating) around the light axis and a positive refractive power (for converging) at the peripheral portion. In the embodiments of the present invention, a cooling liquid whose refractivity is 1.44671 is filled between the liquid crystal panel and the eleventh lens L11 so as to cool the liquid crystal panel and the polarizing plate, as well as to reduce the loss of the image light caused by reflection and obtain high contrast images. The refractive power of the third lens groups is calculated and evaluated by considering the cooling liquid, the liquid crystal panel, and the polarizing plate.

Because the projection lens unit of the present invention is composed so that the third lens group comprises aspheric lenses having a negative refractive power (for dispersing) around the light axis and a positive refractive power (for condensing) at the peripheral portion, the diameters of both the third and second lens groups are reduced, thereby reducing the manufacturing cost and making good use of the advantage of the basic configuration comprising three lens groups. In addition, because the second lens group comprises aspheric lenses having a positive refractive power around the light axis and a negative refractive or almost no refractive power at the peripheral portion, the second lens group, when combined with the third lens group, can have the function of a beam expander (for converting the width of a light flux) optical unit that can compress a light flux from the liquid crystal panel in the radius direction. Consequently, it is possible to reduce the effective height of the liquid crystal panel (the distance between the center of the panel and each corner), making it easy to correct aberrations including the magnification color aberration.

Aspheric lenses are all plastic lenses. The prices of those lenses are low if they are mass-produced. According to the present invention, the eleventh and tenth lenses L11 and L10 are aspheric lenses and they are combined at their local portions, thereby canceling the variation of the refractive power caused by changes of the temperature and humidity. Hereunder, the technique which is employed by the present invention will be described in detail.

In the first embodiment of the present invention shown in FIG. 6, if a light flux that is in parallel to the light axis (1, 1') enters the eleventh and tenth lenses L11 and L10, a dispersing function (concave lens) works around the light axis (1, 1') of the eleventh lens L11 and a condensing function (convex lens) works at the peripheral portion. On the other hand, a condensing function (convex lens) works around the light axis (1, 1') of the tenth lens L10 and a dispersing function (concave lens) works at the peripheral portion. In other words, on the eleventh and tenth lenses L11 and L10, which are plastic aspheric lenses, a dispersing function (concave lens) works on the eleventh lens L11 and a condensing function (convex lens) works on the tenth lens L10 in the area around the light axis where the light flux from the object point P0 on the axis passes. On the contrary, a condensing function (convex lens) works on the eleventh lens L11 and a dispersing function (concave lens) works on the tenth lens L10 at the peripheral portion where the light flux from the object point P1 at the outermost peripheral portion of the screen passes.

Consequently, even when the refractive power is changed by changes of both shape and refractivity of the object lens caused by temperature change and moisture absorption, those factors cancel each other. The conventional problem of focal point change and focusing property deterioration can thus be solved. In the projection lens unit of the present invention, because the light flux from the object point P0 on the axis and the light axis from the object point P1 at the outermost periphery of the screen pass completely different points on each of the first lens L1, the tenth lens L10, and the eleventh lens L11, those lenses are formed as aspheric lenses, thereby aberration on the axis, as well as high-order coma aberration, and astigmatic aberration off the axis are corrected.

Furthermore, as shown in FIGS. 5 through 7, because the eleventh lens L11 through which the light flux from the object point P1 at the outermost periphery of the screen is not formed as a simple concave lens, but is formed as an aspheric lens having a condensing function (convex lens) at the peripheral portion, the lens L11 does not spread the light flux. In addition, the lens L11 allows the lenses disposed after the tenth lens L10 disposed at the screen side to be reduced in diameter respectively, thereby the manufacturing cost of the projection lens unit can be reduced favorably, and it is also effective to correct aberrations including the magnification color aberration.

Next, the shape of the lens surface S21 available for the eleventh lens L11 will be described with reference to FIGS. 6 and 7. The lens surface S21 comes in contact with the cooling liquid.

The screen side lens surface S20 of the plastic eleventh lens L11 is aspheric as described above. On the other hand, if the lens surface S21, which comes in contact with the cooling liquid, is aspheric and its curvature center is, for example, at the screen side, then the rim portion of the lens is thinned excessively, thereby the resin does not flow smoothly during molding and the rim portion is not shaped as predetermined. On the contrary, to secure a sufficient thickness for the rim portion, the center of the lens becomes thick excessively and much more resin is needed during molding. In addition, it takes much more time for the molding, resulting in a significant increase in the manufacturing cost of the projection lens unit. In order to avoid such problems, therefore, the lens surface S21 that comes in contact with the cooling liquid is formed flat or so that the center of curvature comes to the liquid crystal panel side. The lens L11 can thus be formed uniformly with less difference in thickness between the rim portion and the center portion.

FIGS. 10 through 18 show that aberrations occur when an image is displayed on a 1.6-inch single-plate liquid crystal panel using the projection lens unit of the present invention as described above and the image is expanded and projected on a 50-inch screen.

Figure 10:
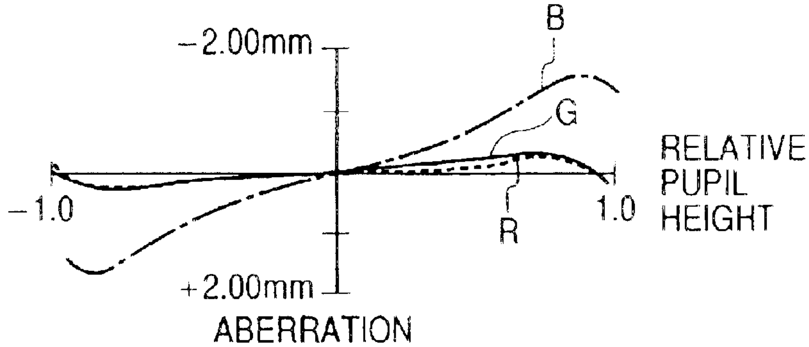
FIG. 10 is a characteristic chart for indicating the aberration in the projection lens unit of the present invention.
Figure 12:
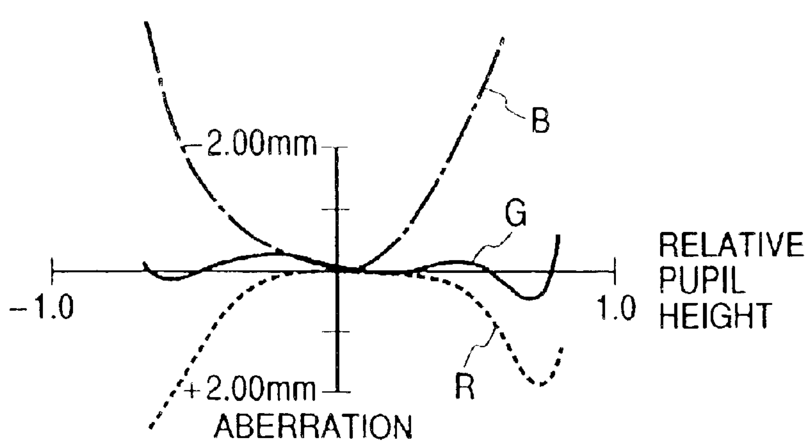
FIG. 12 is a characteristic chart for indicating the aberration in the projection lens unit of the present invention.

FIGS. 10 through 12 are characteristics charts corresponding to the data in Table 1. FIG. 10 is a characteristics chart showing aberrations on the axis. The character B in FIG. 10 indicates an aberration with a 450 nm light flux and the character G indicates an aberration which occurs with a 555 nm light flux. The character R indicates an aberration which occurs with a 650 nm light flux. FIG. 11 shows an aberration which occurs for an image at a 40% height. FIG. 12 shows an aberration for an image at an 80% height.

Figure 13:
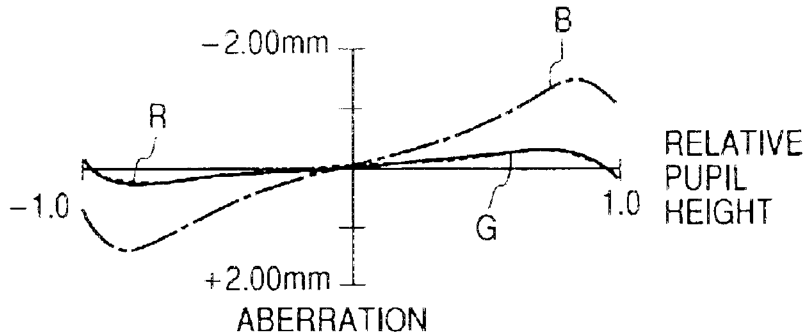
FIG. 13 is a characteristic chart for indicating the aberration in the projection lens unit of the present invention.
Figure 14:
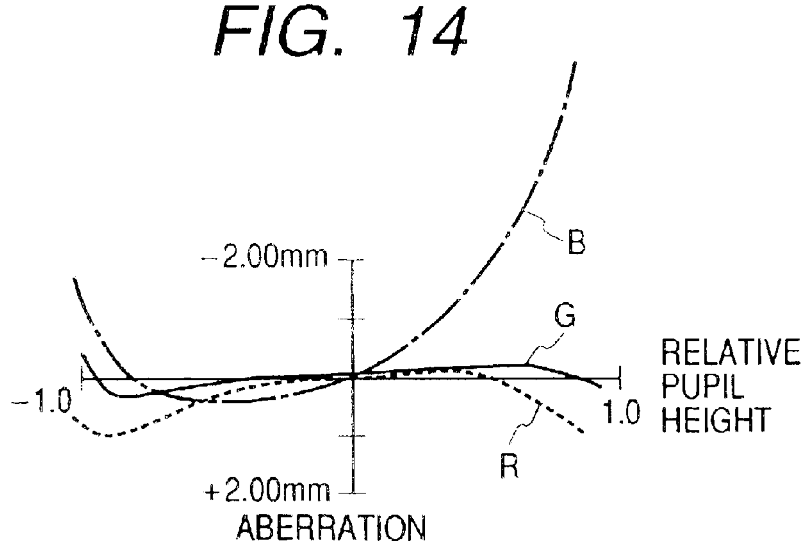
FIG. 14 is a characteristic chart for indicating the aberration in the projection lens unit of the present invention.
Figure 15:
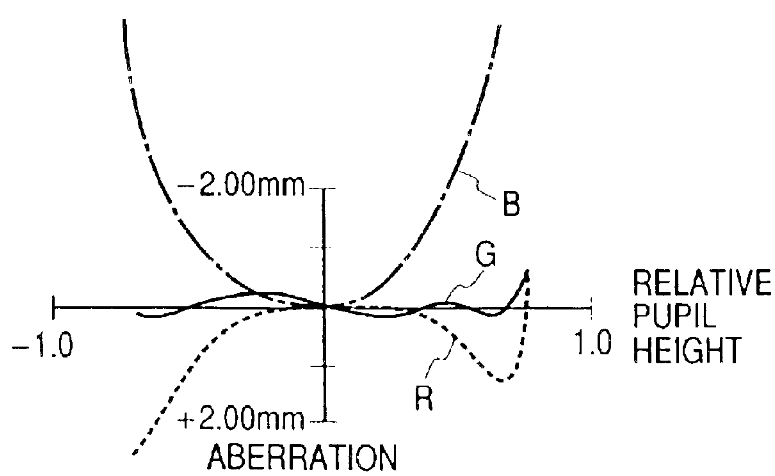
FIG. 15 is a characteristic chart for indicating the aberration in the projection lens unit of the present invention.
Figure 16:
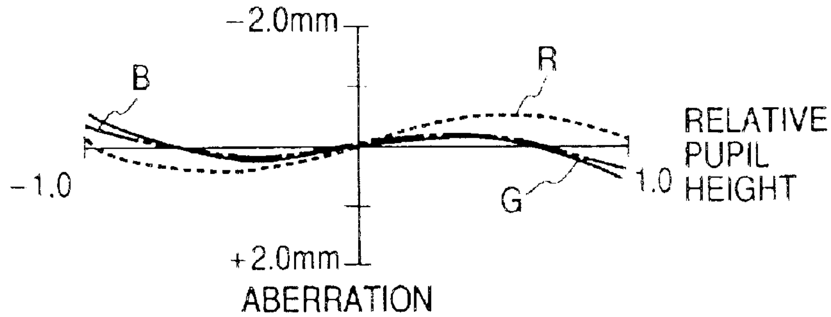
FIG. 16 is a characteristic chart for indicating the aberration in the projection lens unit of the present invention.
Figure 17:
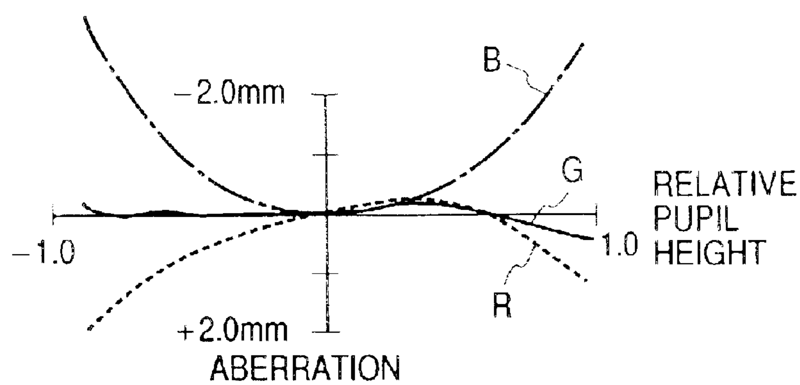
FIG. 17 is a characteristic chart for indicating the aberration in the projection lens unit of the present invention.
Figure 18:
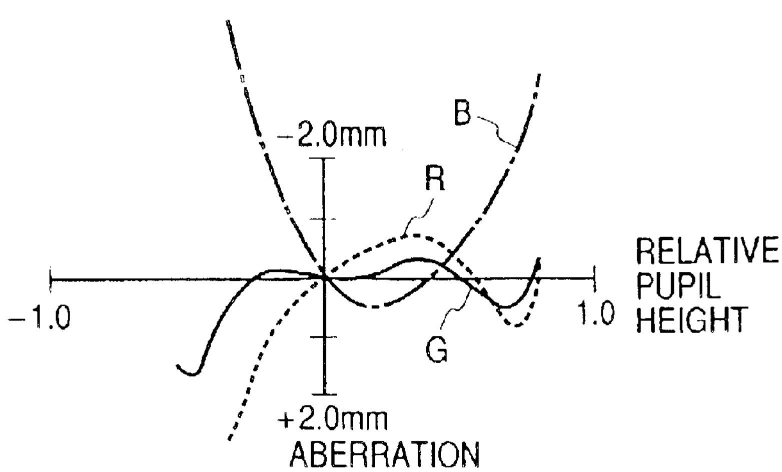
FIG. 18 is a characteristic chart for indicating the aberration in the projection lens unit of the present invention.

In the same way, FIGS. 13 through 15 show characteristics charts corresponding to the data in Table 2. FIGS. 16 through 18 show characteristics charts corresponding to the data in Table 3. In the embodiments shown in Tables 1 and 2, the aberrations which occur on the axis with the light fluxes of green (555 nm) and red (650 nm) light are corrected favorably as shown in FIGS. 10 and 13. However, the blue (450 nm) light flux causes an aberration of 1.7 mm as a maximum in the same embodiments.

Figure 19:
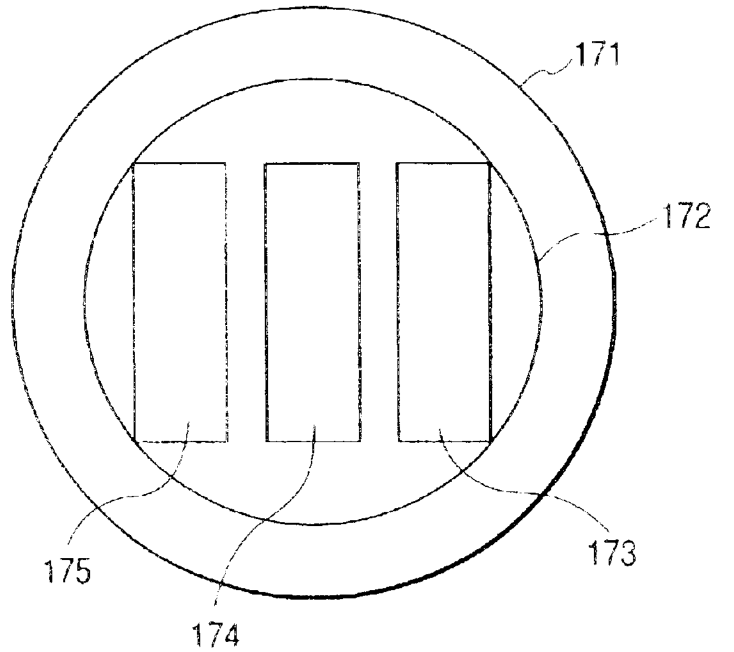
FIG. 19 is a diagram which shows eclipse of a light flux at the pupil of the projection lens of the present invention.
Figure 20:
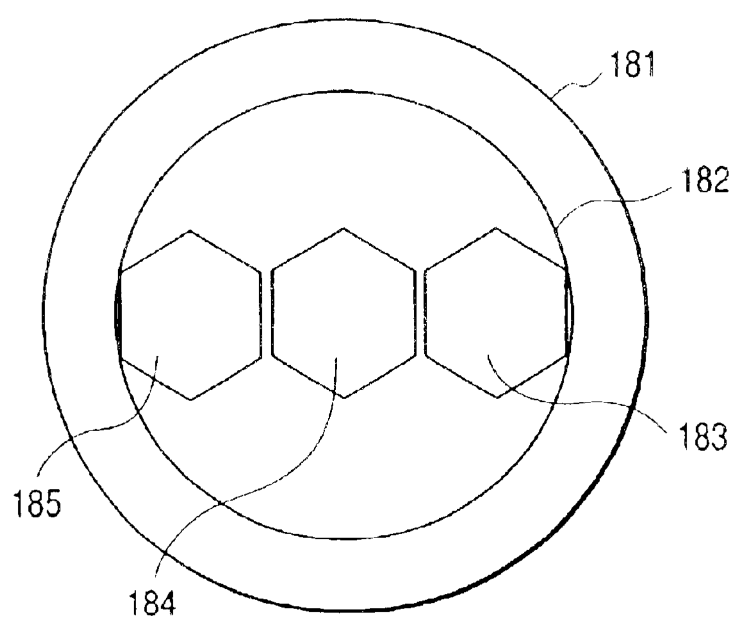
FIG. 20 is a diagram which shows eclipse of a light flux at the pupil of the projection lens of the present invention.

The lighting unit of the present invention is composed so as to separate white light into three primary color light fluxes by the use of dichroic mirrors in the order of blue, green, and red. Each light flux enters one and the same liquid crystal panel at an angle different from the others Consequently, if the light fluxes of the three primary colors modulated by the liquid crystal panel pass through the injection pupil of the projection lens unit as shown in FIGS. 19 and 20, then they are separated in the horizontal direction of the screen of the liquid crystal panel. This is why the dichroic mirrors are used to separate a white light into three primary colors so that the blue light flux passes the center of the injection pupil. The blue light flux causes the largest aberration when the light flux passes a point around the injection pupil. In addition, at this time, it is recommended to correct the orientation of the aberration (positive sign) caused by the red light flux in the direction for canceling the magnification color aberration as shown in FIGS. 11, 12, 14, and 15 (represented as a deviation between the focal points of the green light flux and the red light flux and usually given a negative sign). It is a concrete example for improving the focusing property including that of the lighting optical unit on the basis of the embodiments of the present invention. In the embodiment of the present invention shown in Table 3, as for the aberrations on the axis as shown in FIG. 16, the aberrations caused by all of the red, blue, and green light fluxes are corrected favorably for reasons of comparison. On the other hand, as for the aberrations which occur on the axis, the aberration caused by the red light flux has a negative sign once and the aberration is overlapped with the (In particular, 80% image height) magnification color aberration (represented as a deviation between the focal points of the green and red light fluxes and usually has a negative sign), thereby the image is broken together with its colors on the screen. Significant deterioration of the focusing property can therefore be observed.

There are differences as shown below between the projection lens unit shown in Tables 1 and 2 and the projection lens unit shown in Table 3 with respect to the focal distance, the dispersion of the fifth and sixth lenses, and the combined focal distance of the seventh and eighth lenses.

$$P78/P0<-0.2$$

$$0.4>P6/P0$$

$$vd6>37.3$$

wherein,

P78: Inverse number (refractive power) of the combined focal distance of the seventh and eighth lenses,

P0: Inverse number (refractive power) of the combined focal distance of the whole projection lens unit,

P6: Inverse number (refractive power) of the combined focal distance of the sixth lens, and vd6: Abbe number of the sixth lens On the other hand, the projection lens unit of the present invention will experience no problem in practical use, since the image distortion is as low as 0.5% although the image angle is as wide as almost 90 degrees.

Furthermore, the F number indicating the brightness of the projection lens unit of the present invention is about 1.5, which is far smaller than F2.4 of the conventional projection lens unit whose image angle is over 90 degrees. The projection lens unit of the present invention can secure a satisfactory brightness. Furthermore, the projection lens unit of the present invention can focus images in every corner of the screen, since the lens unit has aspheric lenses at places where the light flux focused in the center of the screen is not overlapped with the light flux focused at the outermost peripheral portion of the screen so as to project bright images.

Furthermore, because the projection lens unit of the present invention comprises three lens groups, the injection pupil through which the light flux is focused at the periphery of the screen is larger than that on the light axis, and the main beam of the light flux is output almost in parallel to the light axis of the projection lens unit (telecentric configuration). Thus, a sufficient peripheral light volume ratio can be secured. Although the image angle is as wide as almost 90 degrees, the reflectivity reaches 50% or over at the outermost periphery (100% corner) because of the telecentric configuration in which the main beam of the light flux from each point of the liquid crystal panel enters almost in parallel to the light axis of the projection lens unit. The projection lens unit will experience no problem in practical use.

In the embodiments of the present invention, as described above, the positive refractive power of the whole projection lens unit is concentrated in the second lens group and lens groups having a negative refractive power respectively are disposed both at the screen side and at the liquid crystal panel side.

The first to third lenses L1 to L3 of the four lenses which makes up the first lens group G1 are all meniscus lenses whose convex surfaces face the screen side so as to suppress generation of aberration and correct image curvature as described above.

Figure 9:
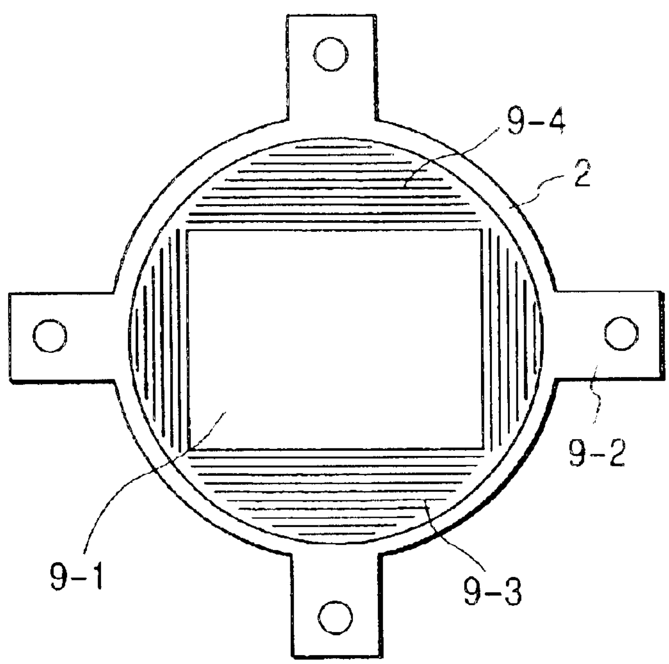
FIG. 9 is a diagram showing an aperture provided for the lens tube of the projection lens unit of the present invention.

Furthermore, in the projection lens unit of the present invention, the space between the second and third lens groups G2 and G3 can be changed as shown in FIG. 5 to adjust the focus when the magnification of images is changed for changing the projection distance, thereby expanding and projecting those images on the screen. At this time, the image curvature which occurs and the magnification color aberration change can be canceled by moving the fourth lens L4 along the light axis. The outer lens tube 2 of the projection lens unit shown in FIG. 5 is provided with an aperture 9-1 shaped not like a circle and used to absorb and block those light fluxes modulated by the liquid crystal panel, as shown in FIG. 9, which are not required for forming the object image, while passing light fluxes required for focusing the object image. In addition, the L11 side surface 9-3, which receives injected light fluxes, are provided with an uneven light absorption structure 9-4. This uneven structure may be formed like hair lines, embossed, and matted so as to prevent reflected beams from returning to the liquid crystal panel. Consequently, light fluxes not required for forming the object image do not reach the screen, thereby the contrast property of the lens unit is further improved.

Of the three plastic aspheric lenses of the projection lens unit in the embodiments of the present invention, the first lens L1 is formed so as to reduce the refractive power as much as possible. In addition, because the lens is shaped with a unified thickness, it can reduce the variation of the refractive power caused by shape and refractivity changes which occur due to a temperature change and moisture absorption peculiar to plastic lenses.

Furthermore, the tenth and eleventh lenses L10 and L11 are formed so as to have the absolute value of the refractive power almost equal between both of those lenses, thereby each of those lenses can reduce the variation of the refractive power caused by shape and refractivity changes which occur due to a temperature change and moisture absorption on each of the lenses.

The seventh lens is a double-convex lens composed of a highly dispersing material. It is laminated on the eighth lens element, thereby enabling the color aberration to be corrected on the axis mainly.

This completes the description of the features of the projection lens unit in the embodiments of the present invention with reference to the lens data.

Although aspheric lens surfaces use aspheric surface coefficients up to the tenth-order of one AH in this embodiment, the present invention also includes another configuration of the projection lens unit that uses higher-order coefficients over the twelfth one, of course.

Both the liquid crystal panel and the polarizing plate have characteristics for lowering the polarizing characteristics. In particular the polarization degree (light volume ratio when lights pass through a polarizing plate at an angle of 0° and 90° to the surface of the polarizing plate respectively) when the temperature rises (for example, to 70°). Consequently, when the temperature rises, the contrast ratio is reduced. In order to prevent this, the present invention cools both the liquid crystal panel and the polarizing plate with a cooling liquid. Because the temperature of each of the liquid crystal panel and the polarizing plate is cooled by about 7° C. to 10° C. more than the forcible air-cooling method, the contrast ratio of the display unit can be improved by about 10%.

Furthermore, both the liquid crystal panel and the polarizing plate become a factor for deteriorating the contrast if they are used under a high temperature (for example, 70° C. in maximum). However, if the liquid crystal panel and the polarizing plate are used in the cooling liquid, their service lives can be extended by about 1.5 to 2 times more if the temperature is lowered by 10° C. when in operation.

As shown in FIG. 5, if the polarizing plate 8 is disposed and cooled in the cooling liquid 9, it is recommended to place the polarizing plate 8 between a pair of glass plates and seal the plate 8 with a ring-like sealing material so as to cover the peripheral portion entirely (to prevent an invasion of the cooling liquid from outside). The sealing material should be an adhesive like silicon.

Usually, the cooling liquid 9 is an organic solvent such as ethylene glycol, decylene glycol, glycerin, or a mixed liquid of those items. If the polarizing plate 8 formed with extended resin is dipped directly in the cooling liquid, therefore, the polarizing plate 8 may be melted. In order to avoid this problem, in this embodiment, the polarizing plate 8 is disposed between a pair of glass plates, thereby preventing the polarizing plate 8 from direct contact with the cooling liquid 9.

Furthermore, the second method for improving the brightness in the embodiments of the present invention is to employ the projection lens unit as described above so as to p-polarize the light flux which enters the transmission type screen and reduce the reflection loss on both lens elements and the screen of the projection lens unit. As a result, the multiple reflection between lens elements is reduced, thereby the contrast property of projected images is also improved. On the other hand, multiple reflection can be reduced even on the screen (In particular the surface of the Fresnel lens), thereby the contrast property of projected images can be improved significantly.

Figure 3:
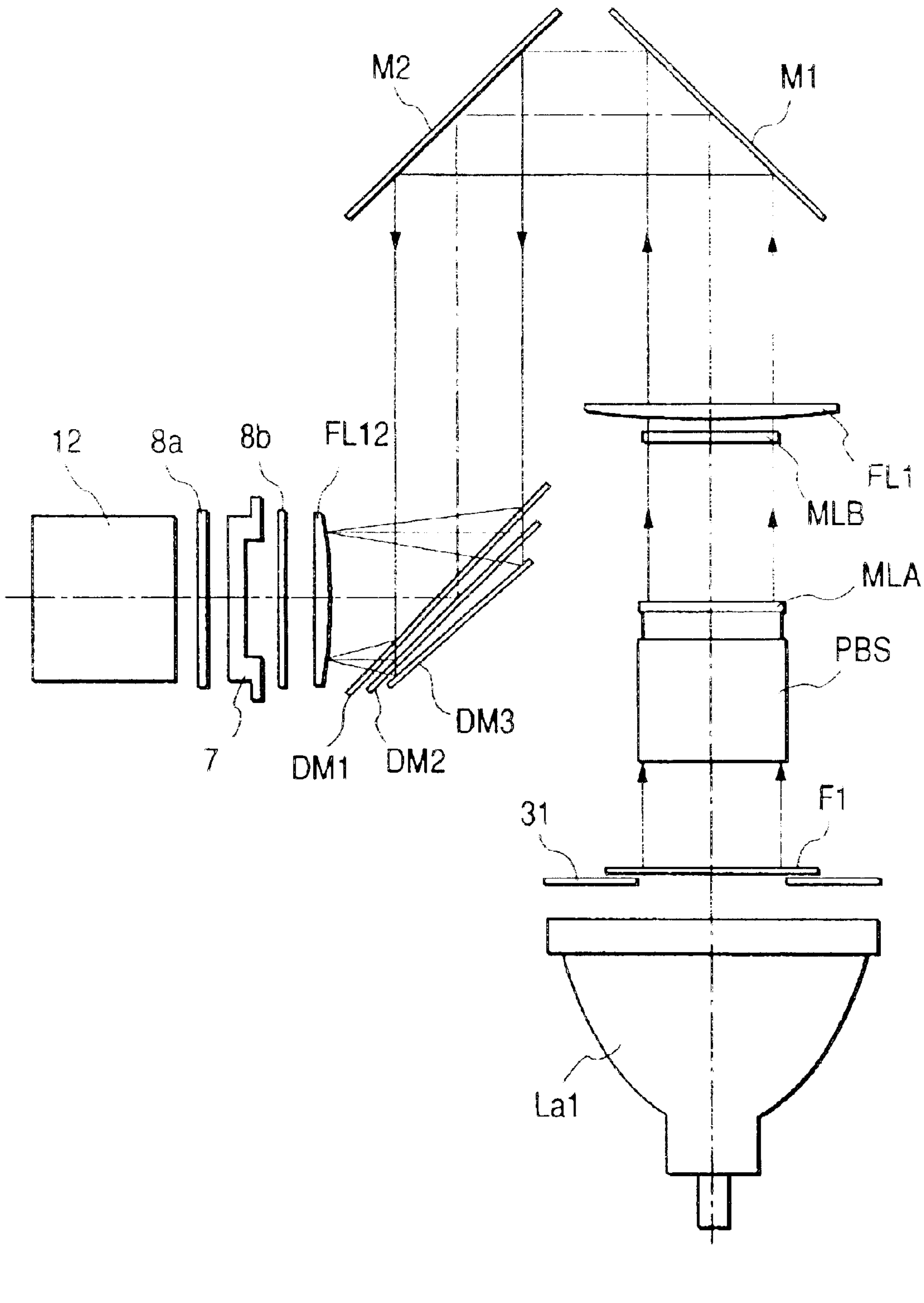
FIG. 3 is a diagram showing the configuration of the main portion of the optical system of the present invention.

The third method for improving the brightness involves separating white light from a white light source into the light fluxes of the three primary colors as shown in FIG. 3 and combining the dichroic mirrors for causing each of those light fluxes to enter at an angle different from the others.

Disposition of the dichroic mirrors is started at the white light source La1 side in order of DM3 for transmitting cyan (blue and green), DM2 for transmitting yellow (green and red), and DM1 for transmitting red. The element FL1 disposed at the light ejection side of the micro-lens array MLB shown in FIG. 3 and the element FL2 disposed at the light ejection side of the dichroic mirrors DM1, DM2, and DM3 are field lenses for arranging the light fluxes from the multi-lens arrays MLA and MLB approximately in parallel to each other.

Figure 23:
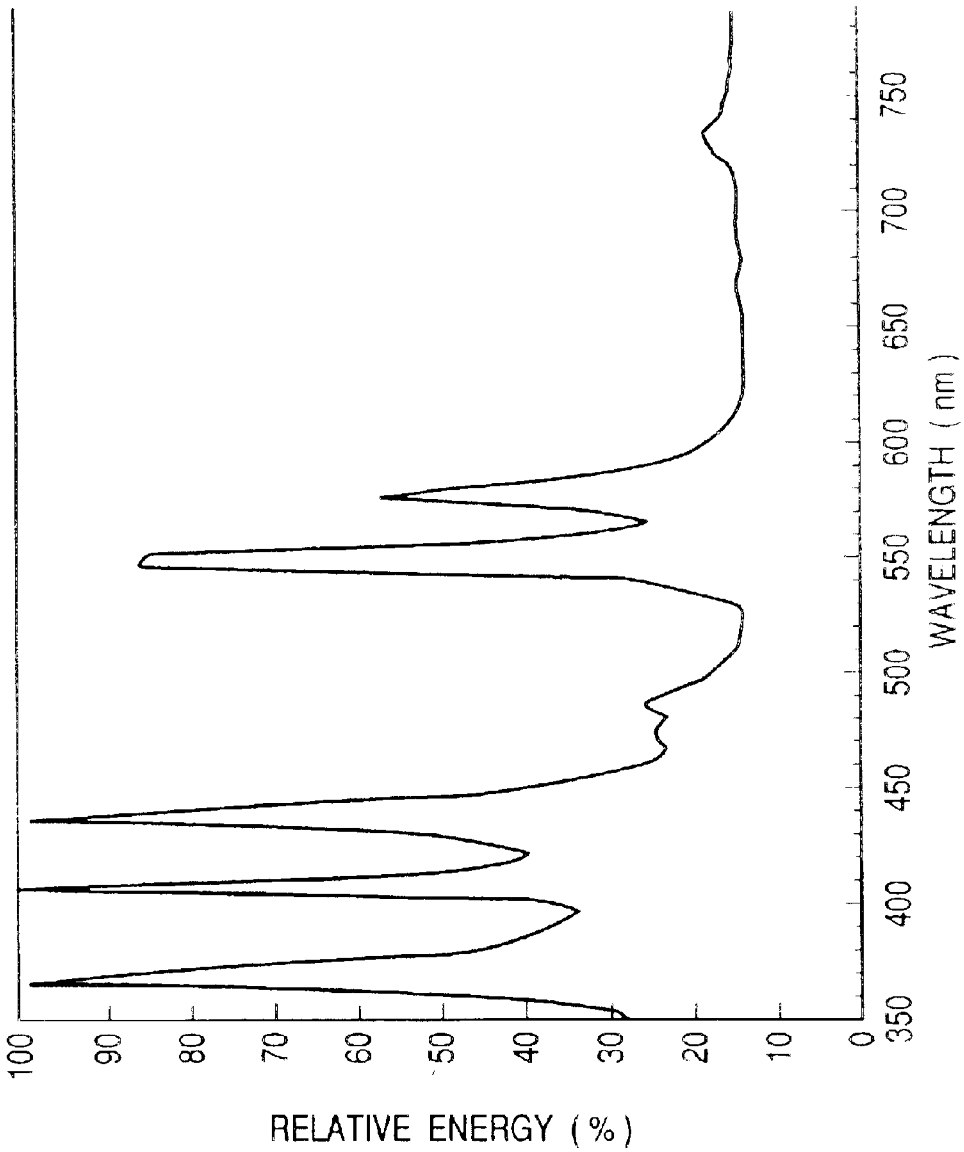
FIG. 23 is a spectral distribution chart of the wavelength of an ultra-high voltage mercury lamp used in the embodiments of the present invention.
Figure 24:
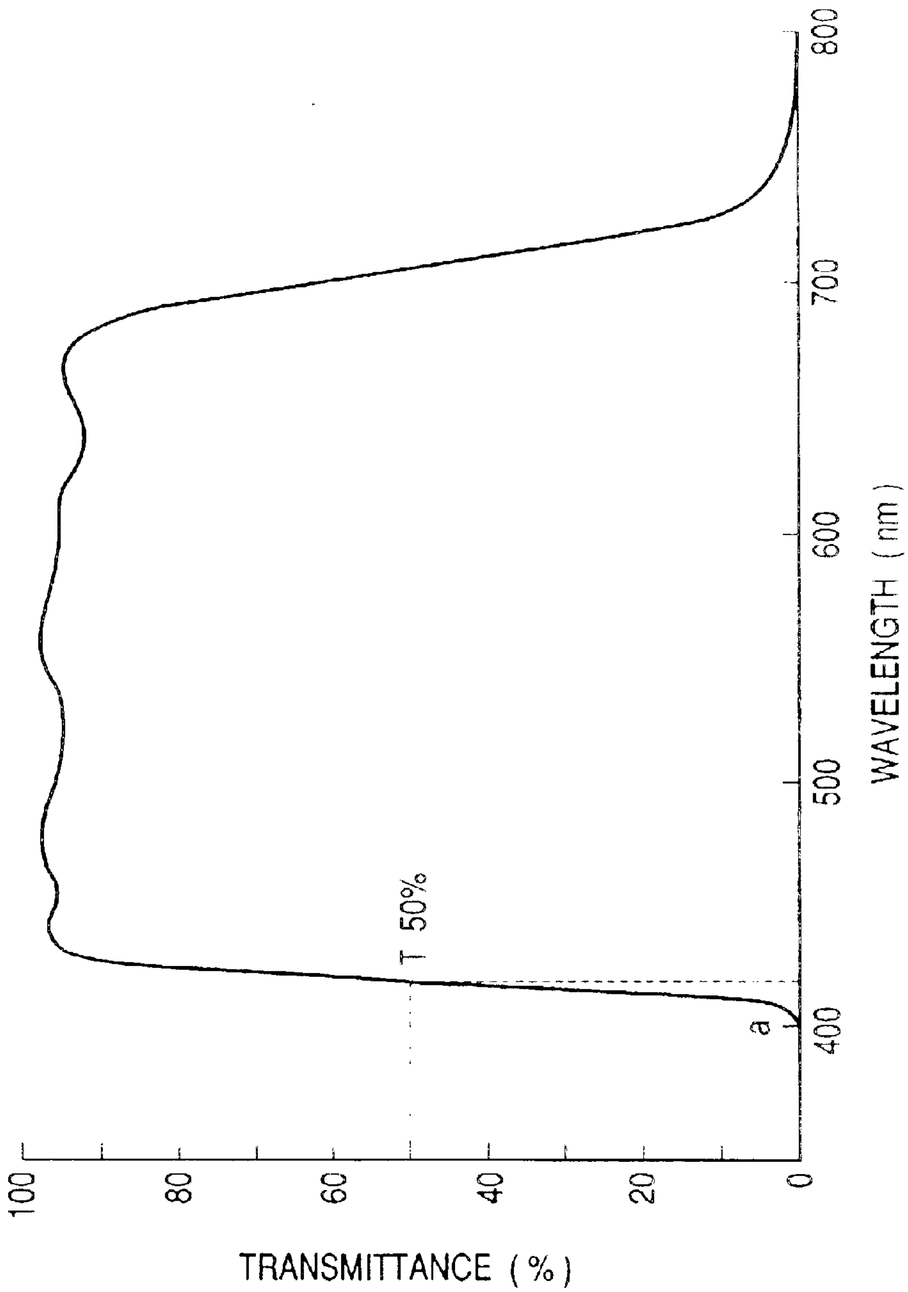
FIG. 24 is a characteristic chart indicating the spectrum transmission rate of a filter used for the optical system of the present invention.
Figure 25:
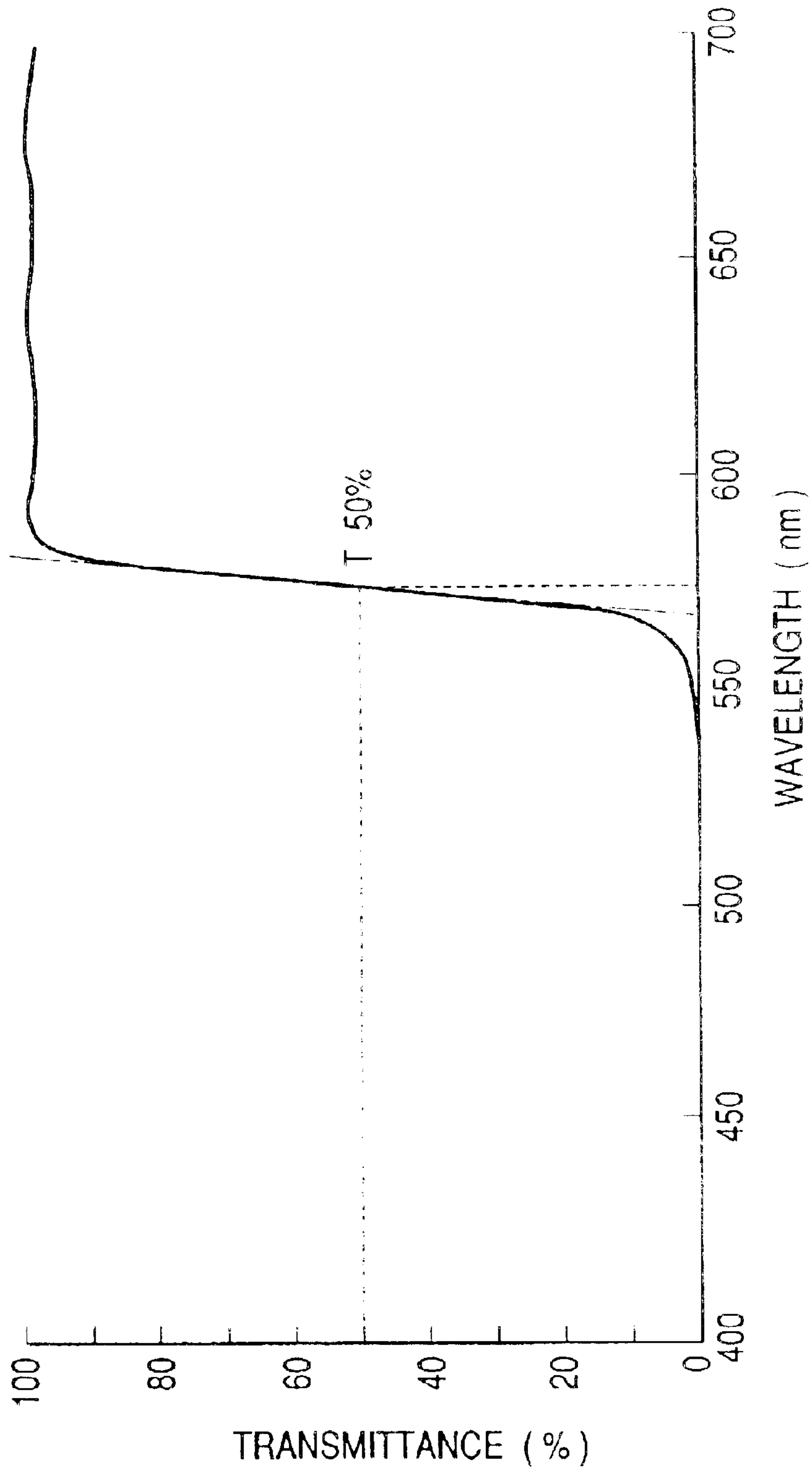
FIG. 25 is a characteristic chart indicating the spectrum transmission rate of the filter used for the optical system of the present invention.
Figure 26:
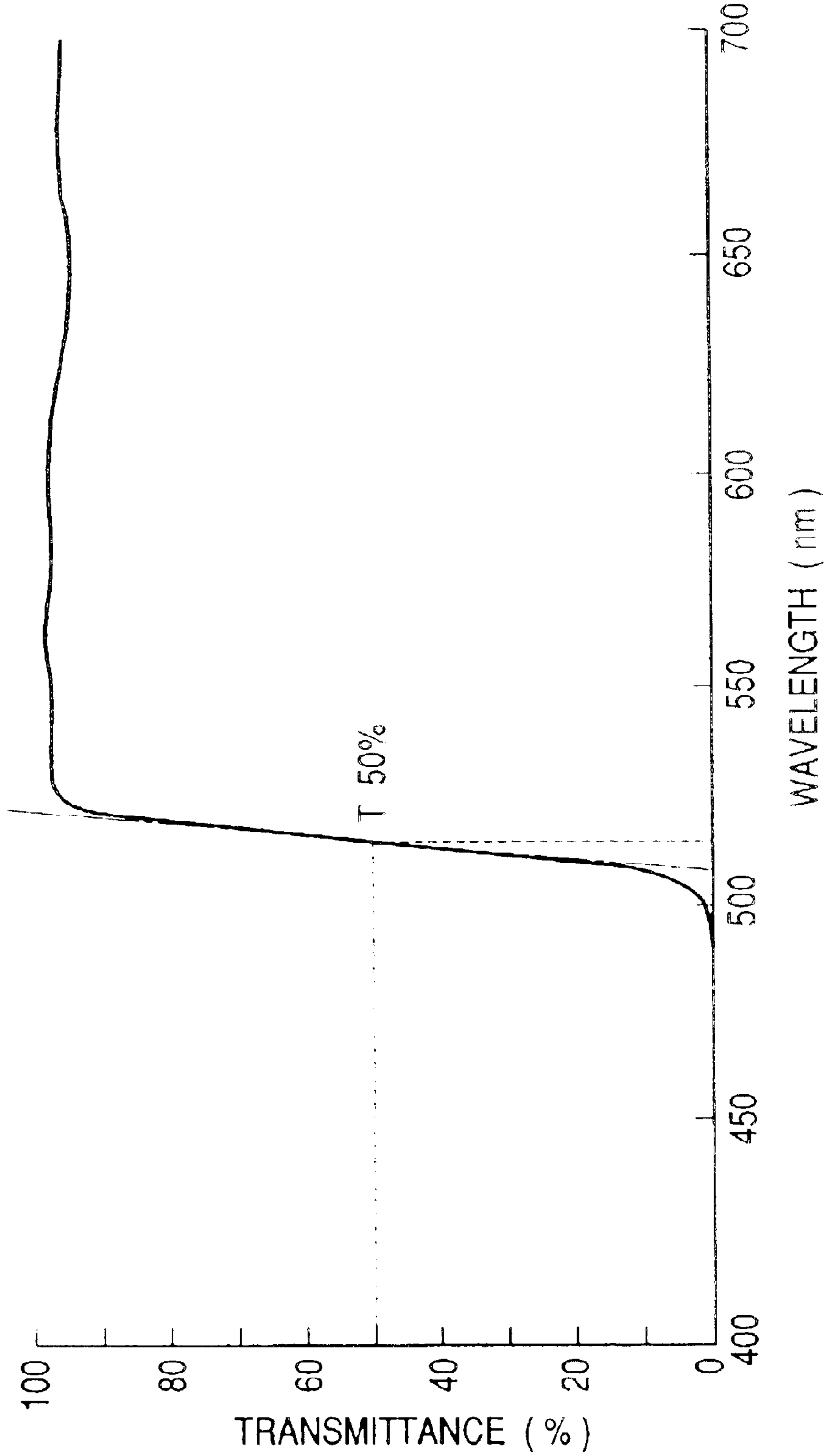
FIG. 26 is a characteristic chart indicating the spectrum transmission rate of the filter used for the optical system of the present invention.

At this time, the wavelength T50% is defined as the optimal value by considering both brightness and color purity. The wavelength T50% makes it possible to let each dichroic mirror have a reflection rate of 50% or over. The white light source La1 is any one available on the market, such as an ultra-high voltage mercury lamp (for example, UHP lamp: Philips Inc.) if it has an excellent emission efficiency. However, because this lamp is manufactured on the basis of a mercury lamp, the emission energy in the red light wavelength area is weaker than that in the blue light wavelength area. It is thus difficult to satisfy the requirements of both red color purity and brightness of the set (projection lens unit). In order to solve this problem, the inventor et al manufactured an optical lighting system by way of trial using an ultra-high voltage mercury lamp having an emission energy distribution as shown in FIG. 23 and confirmed that the requirements of both brightness and color purity are satisfied for the object projection lens unit as follows. A filter F1 was disposed between the ultra-high voltage mercury lamp and the PBS to cut both ultraviolet and infrared rays. The filter F1 had spectral transmittance characteristics as shown in FIG. 24. In addition, the dichroic mirrors used for this manufacturing trial were disposed starting at the white light source side in order of a dichroic mirror DM1 for transmitting cyan (blue and green) having the spectral transmittance characteristics shown in FIG. 27, a dichroic mirror DM2 for transmitting yellow (green and red) having the spectral transmittance characteristics shown in FIG. 26, and a dichroic mirror DM3 for transmitting red having the spectral transmittance characteristics shown in FIG. 25. Each dichroic mirror is declined at a portion where the transmittance characteristics are changed sharply so that the mirror DM1, the mirror DM2, and the mirror DM3 have a transmittance of 6.4%/nm, 6.8%/nm, and 6.8%/nm or over, respectively. In addition, if a wavelength becomes T50% or over (this value allows the reflection factor of each dichroic mirror to reach 50% or over), the following conditions are satisfied, thereby the requirements of both brightness and color purity are satisfied for the object projection lens unit. In this case, λDM1 indicates a wavelength for allowing the reflection factor of the dichroic mirror DM1 for transmitting cyan (blue and green) to become 50% or over (T50%), λDM2 indicates a wavelength for allowing the reflection factor of the dichroic mirror DM2 for transmitting yellow (green and red) to become 50% or over (T50%), and λDM3 indicates a wavelength for allowing the reflection factor of the dichroic mirror DM3 for transmitting red to become 50% or over (T50%).

λDM1≧585

λDM2≦520

λDM3≧580

Figure 38:
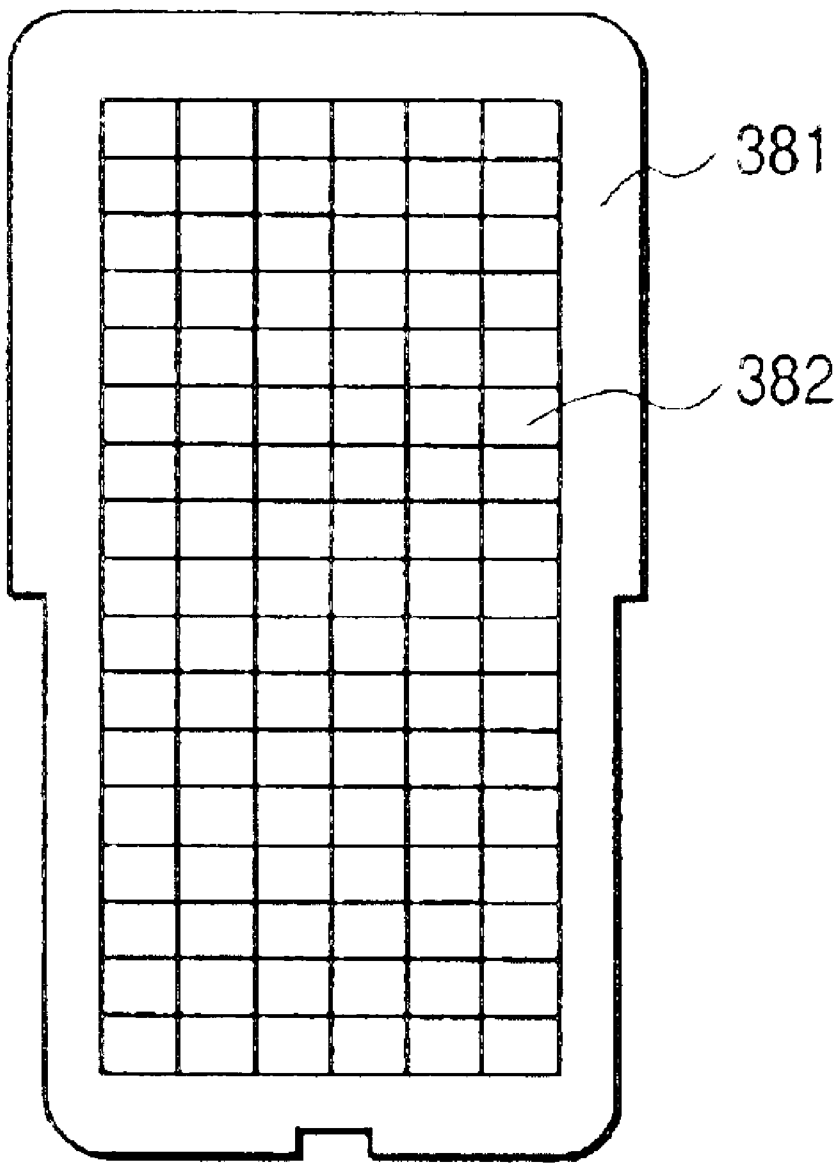
FIG. 38 is a diagram illustrating an embodiment of a multi-lens array.

The fourth method for improving the brightness can increase only a predetermined polarized light component by about 50% if the white light is polarized and combined with other lights using a polarized beam splitter PBS disposed between the white light source La1 and the liquid crystal panel 7 shown in FIG. 3. At this time, because only p-polarized waves are taken out, the reflection loss can be reduced at the pair of multi-lens arrays MLA and MLB, each of which comprises a plurality of lens elements. FIG. 38 shows an embodiment of the multi-lens array. In FIG. 38, numeral 381 is a holding frame provided with a datum plane used to allow the object multi-lens array to be fixed to the optical system case accurately. 382 indicates lens elements of a micro-lens array.

If a p-polarized light enters the micro-lens array, the reflection factor per plane can be reduced by about. 3.% more than the injection of an s-polarized wave. Furthermore, the dichroic mirrors DM1, DM2, and DM3 are disposed vertically relative to the polarized beam splitter PBS optically so as to obtain s-polarized light components. Consequently, because the reflection factor of the reflection mirror in the light path is increased, the brightness is improved.

Furthermore, the fifth method for improving the brightness is to separate white light from a white light source into red, blue, and green in order of weakness of the spectral energy distribution of the white light source when the light fluxes separated by lenses provided in the first multi-lens array MLA close to the white light source La1 are expanded by a lens facing the second multi-lens array MLB positioned at the liquid crystal panel side, then the light fluxes are projected on the liquid crystal panel 7. As a result, the light path between the second multi-lens array MLB and the liquid crystal panel 7 makes the red light flux shortest, so the projection magnification is reduced and the red light flux density is increased with less out-of-focus errors energy to be caused by aberration.

Figure 28:
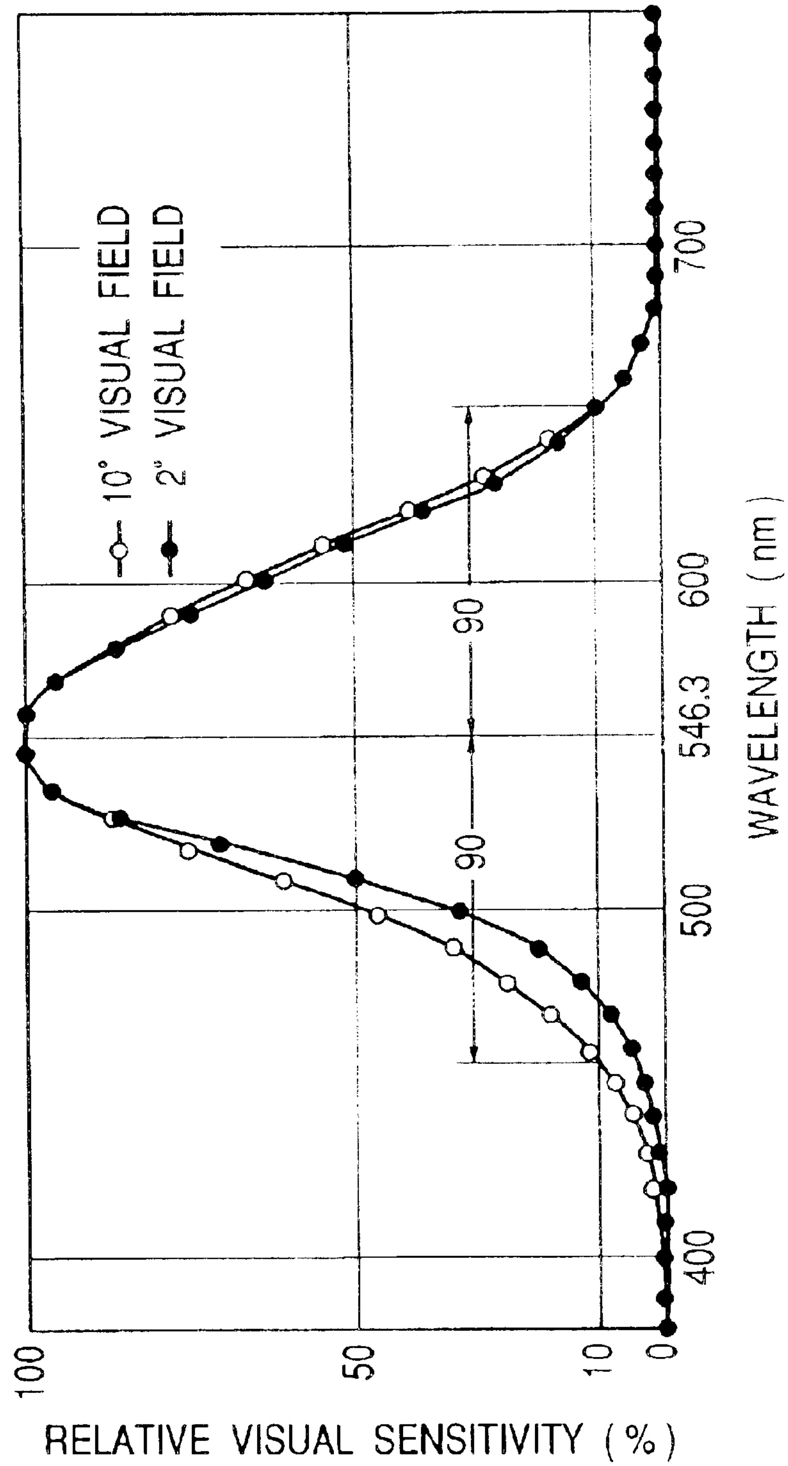
FIG. 28 is a graph which shows relative sensibility characteristics (2-degree visual field and 10-degree visual field) of the naked eye.

On the other hand, the blue light flux has a low relative visibility as shown in FIG. 28 and the transmission factor of the blue light flux of the projection lens unit is low. In addition, because a filter F1 is provided in the light path so as to reflect the ultraviolet rays from the white light source, the effective energy of the blue light flux is reduced. To avoid this problem, therefore, color lights are separated after the red light is separated as shown in FIGS. 19 and 20 so that the blue light flux passes the center of the injection pupil of the projection lens unit, then passes the center TFT aperture of the liquid crystal panel as described above. Consequently, it is possible to maximize the brightness of the white light obtained by adding three colors on the screen, as well as the brightness of each of the three primary colors.

FIG. 19 shows an embodiment in which pixels are disposed in an in-line pattern and FIG. 20 shows an embodiment in which pixels are disposed in a delta pattern.

On the other hand, the ultraviolet ray deteriorates the synthesized resin used for composing the case of the projection lens unit. To avoid this problem, it is recommended to provide the case with a metallic diaphragm 31 so as to protect the case from a direct white light.

Furthermore, the first method for improving the contrast property in the embodiments of the present invention is a projection type image display unit. As shown in FIG. 5, the display unit is provided with a liquid crystal panel 7 and a polarizing plate 8 (the injection side polarizing plate is not illustrated). A cooling liquid is filled in a space formed between the liquid crystal panel 7 and a lens element L11 closest to the liquid crystal panel 7. The liquid crystal panel 7 and the polarizing plate 8 disposed in front thereof are affected by a heat when the temperature rises (to 70° C. or so), thereby their polarizing characteristics are degraded and the contrast property is reduced in some cases. In the above configuration of the present invention, however, both the liquid crystal panel and the polarizing plate are cooled by the liquid (cooling medium) so both items can be cooled more efficiently than the air-cooling method. Consequently, the display unit can be protected from reduction of the contrast property to be caused by the deterioration of the deflection characteristics due to an excessive temperature rise, thereby enabling high quality images to be projected.

Furthermore, if the above cooling liquid has a refraction factor of 1.2 or over with respect to a light whose wavelength is 587.6(nm), as shown in Tables 1 to 3, the reflection of the image light is reduced more, thereby the contrast property can further be improved.

Furthermore, the second method for the same object is to provide the lens tube of the projection lens unit with an aperture shaped so as to pass only light fluxes modulated by the liquid crystal panel and used for forming images and not to pass other light fluxes that are not used for forming images as described above. With this aperture, light fluxes not used for forming images do not reach the screen, thus the contrast property is improved more.

Figure 31:
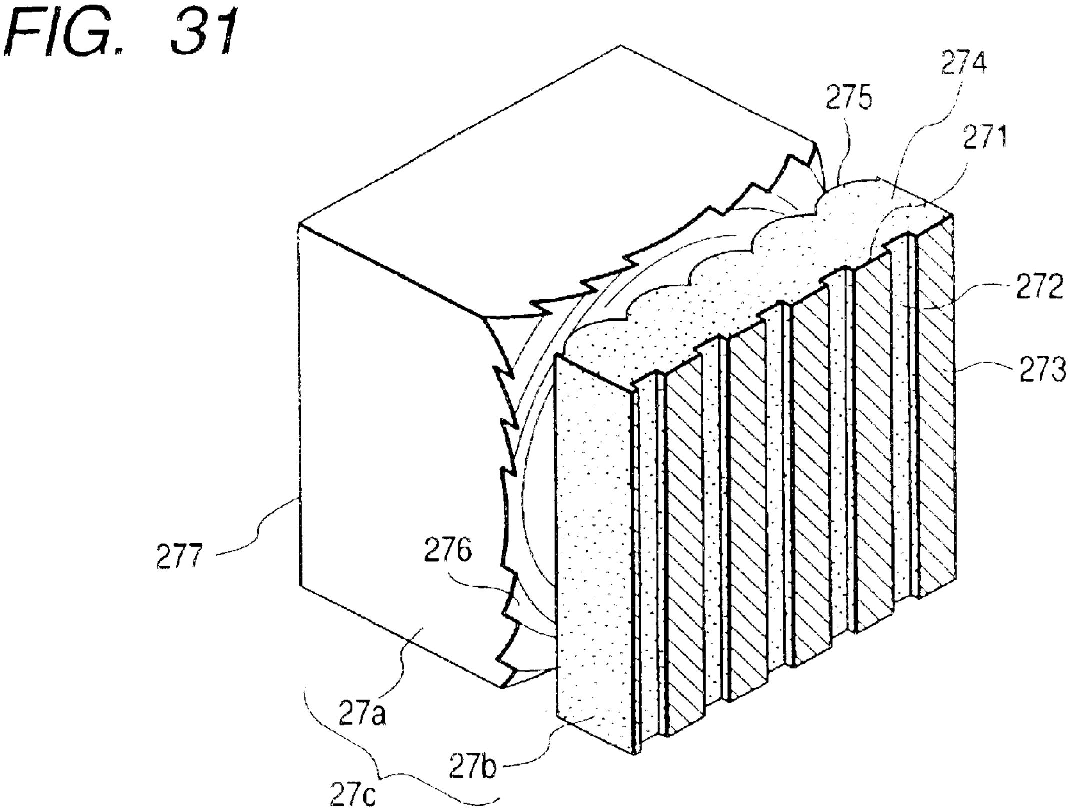
FIG. 31 is a perspective view of the main portion of a transmission type screen.
Figure 32:
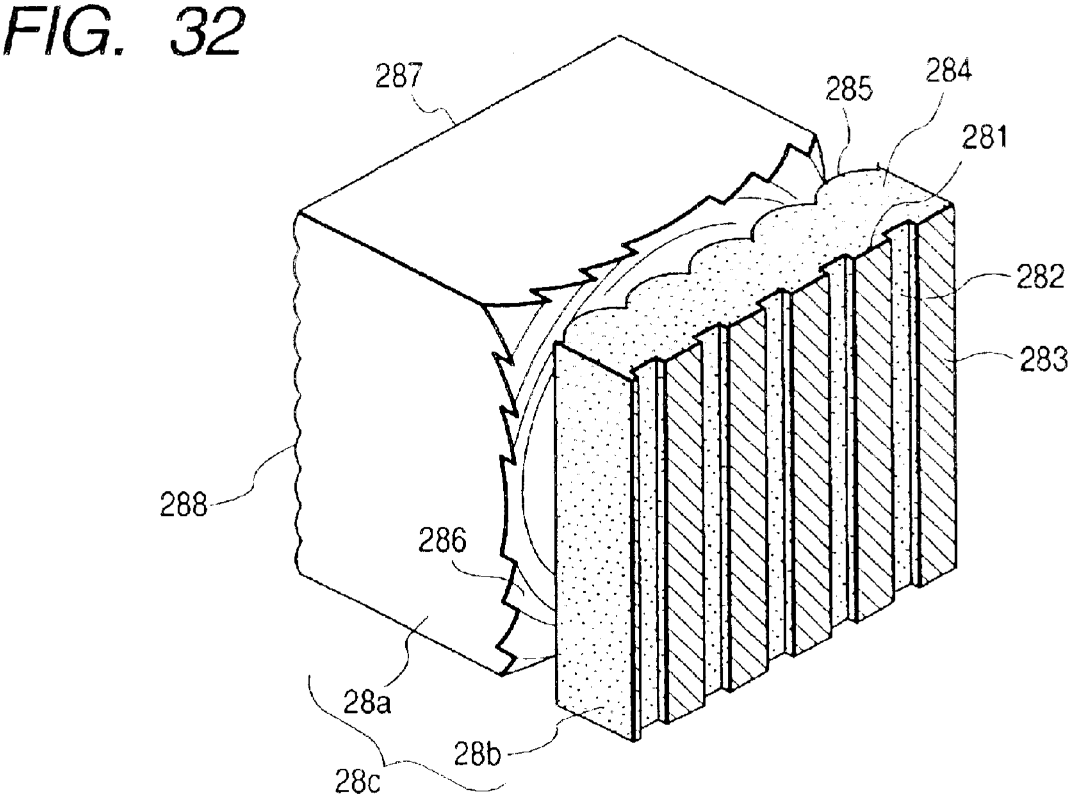
FIG. 32 is a perspective view of the main portion of the transmission type screen.
Figure 33:
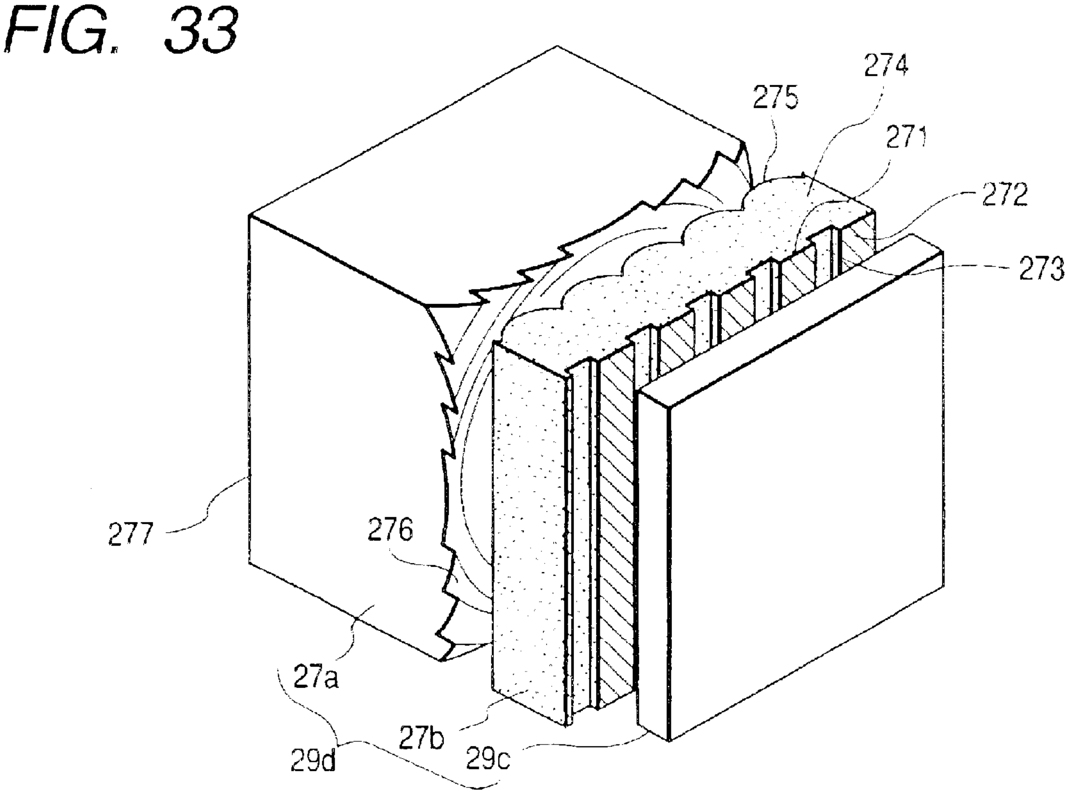
FIG. 33 is a perspective view of the main portion of the transmission type screen.
Figure 34:
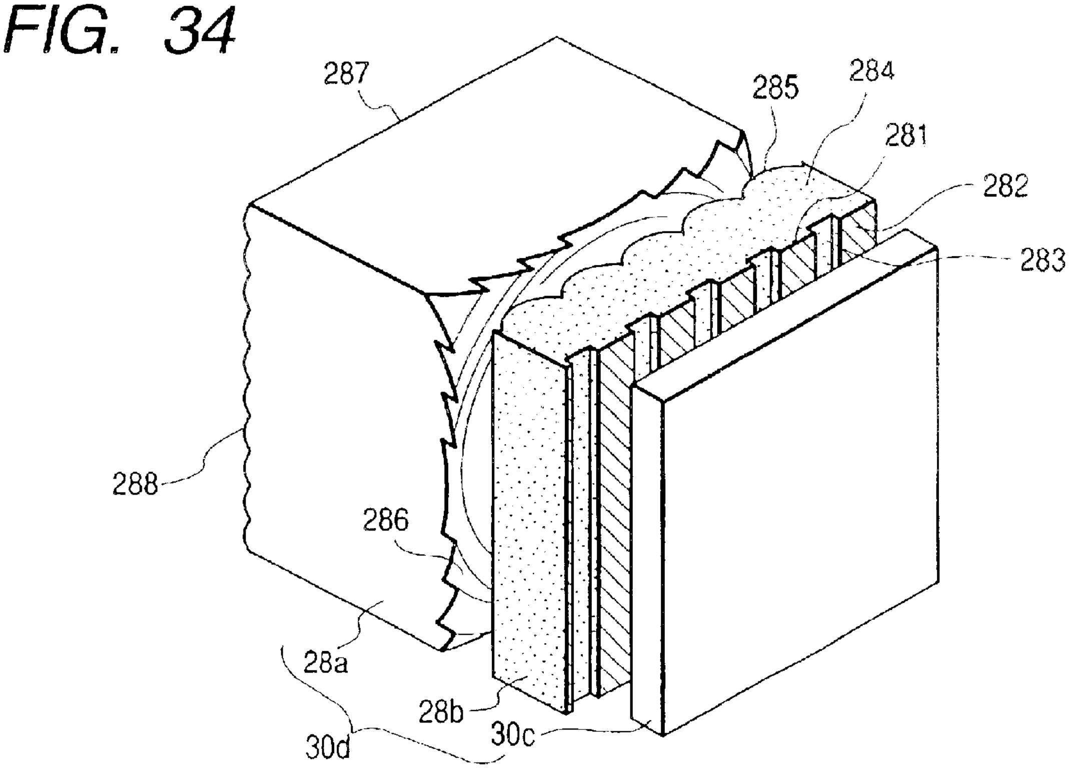
FIG. 34 is a perspective view of the main portion of the transmission type screen.

Furthermore, the third method for the same object is to provide the transmission type screen shown in FIGS. 31 through 36 with filtering characteristics for absorbing the green light emitted from the white light source La1 with the strongest spectrum (the products between the emission energy of the lamp shown in FIG. 23 and the relative sensitivity shown in FIGS. 28 through 30). The inventor et al manufactured a transmission type screen provided with the absorption characteristics shown in FIG. 27 and checked the contrast property. It was found that the contrast property was improved by 6% if the absorption of the green light was increased by 11% around the wavelength of 555 nm. The transmission type screen is classified into those comprising two sheets of, for example, a lenticular sheet 27*b*/28*b* or a Fresnel lens sheet 27*a*/28*a* as shown in FIGS. 31 and 32 and those comprising three sheets of, for example, a lenticular sheet 27*b*/28*b*, a Fresnel lens sheet 27*a*/28*a*, and a wavelength selective filter 29*c*/30*c* as shown in FIGS. 33 and 34. In each screen configuration, it is most effective to dispose the wavelength selective filter at the element disposed closest to the image viewing side of the screen to improve the contrast property.

Figure 35:
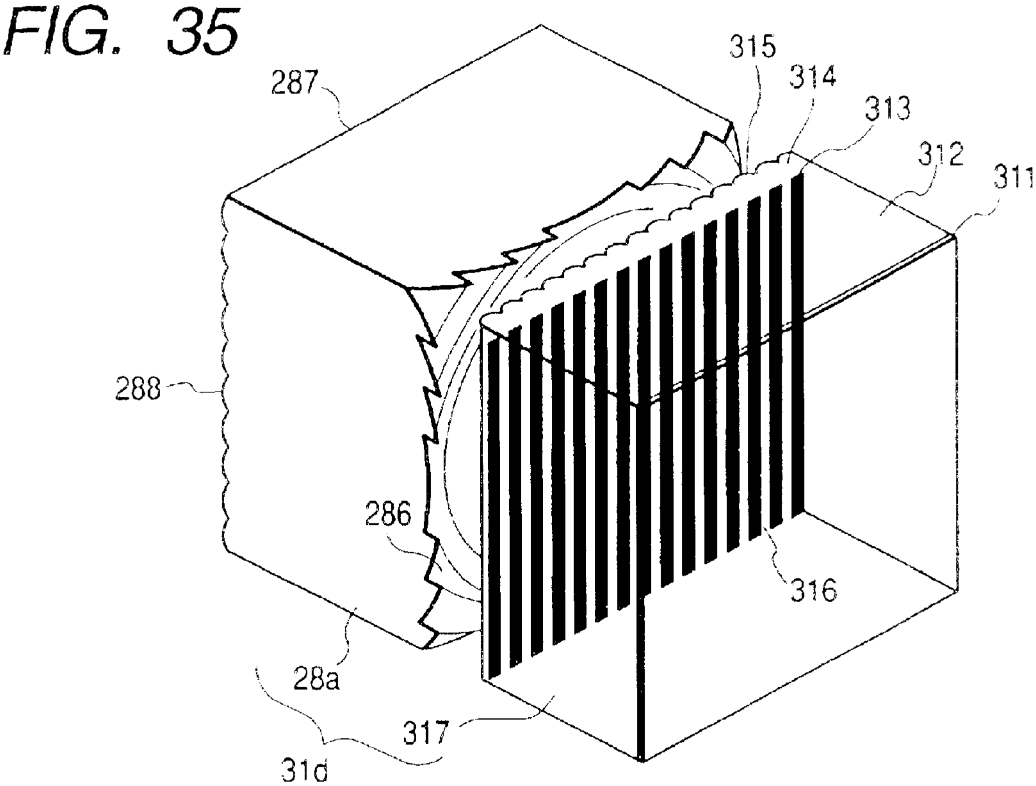
FIG. 35 is a perspective view of the main portion of the transmission type screen.
Figure 36:
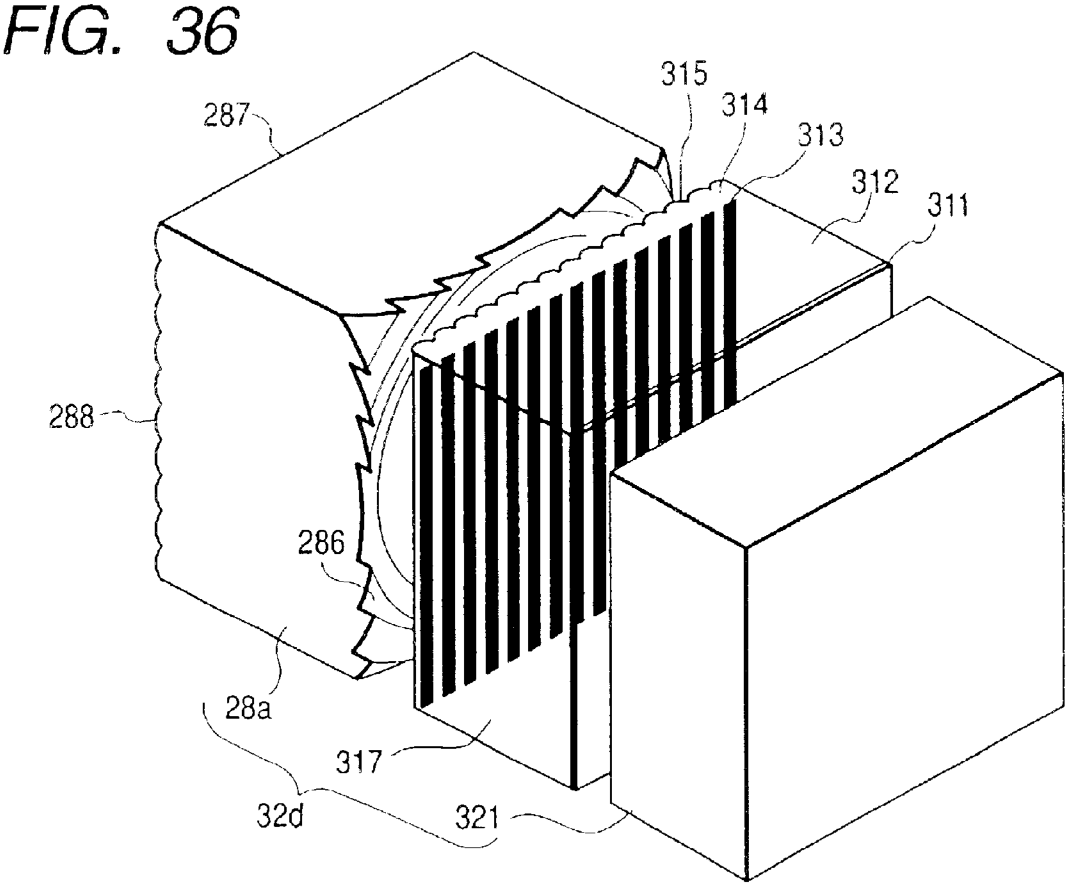
FIG. 36 is a perspective view of the main portion of the transmission type screen.
Figure 37:
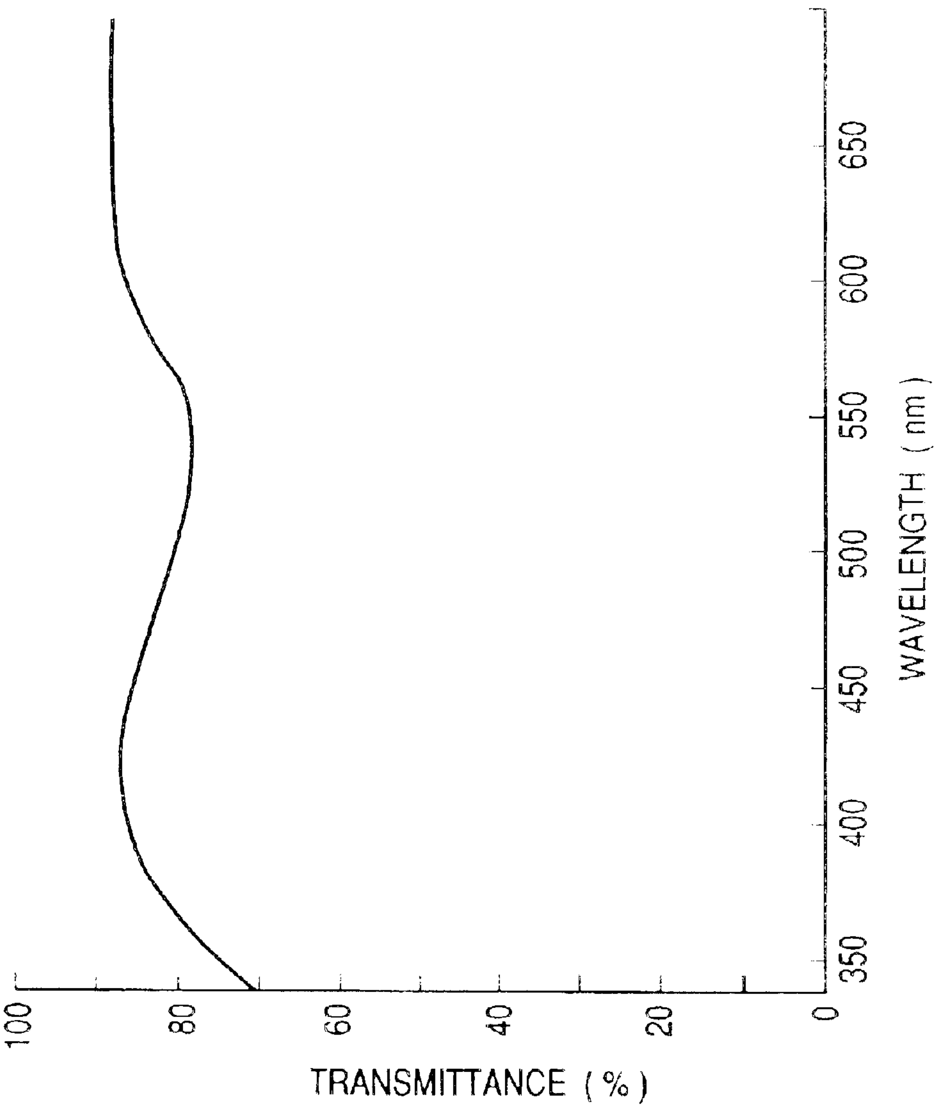
FIG. 37 is a characteristics diagram indicating the spectrum transmission rate of the filter provided for the transmission type screen used for a rear side projection type image display apparatus provided with the optical projection system of the present invention.

In another embodiment, a Fresnel lens sheet 28*a* provided with a Fresnel lens on the image light flux ejection side as shown in FIG. 35 (illustrated as a shape in which the image light flux injection side of the lenticular lens is disposed in the vertical direction of the screen when the horizontal direction of the screen is decided as the longitudinal direction) and lenticular lenses that are the first members are disposed continuously in the horizontal direction of the screen. Each of those lenticular lenses is formed to be longer in the vertical direction of the screen. Light transmission slits 316 are formed around the focal point of each of those lenticular lenses so as to pass the image light flux. In addition, between adjacent slits 316 there is formed a light absorption layer 313 so as to prevent the contrast property from deterioration caused by external lights. The thickness of the first member in the light axial direction is about 1.5 times the lens pitch if the lenses are elliptic ones. The thickness will becomes about 5 times even when each lens is aspheric so as to cause its focal point to deviate. Consequently, if the lens pitch is narrowed, the thickness is also reduced, thereby the mechanical strength of the lens is lowered. To avoid this problem, therefore, the present invention bonds or fastens the first element on the second member (generally thermal plastic resin is used for reasons of cost). The inventor et al thus manufactured a transmission type screen provided with the absorption characteristics as shown in FIG. 37 by mixing a dye or a pigment in this second member, then checked the contrast property. It was found that the contrast property was improved by 6% when the light absorption around the wavelength of 555 nm was increased by 12%. In addition, when a reflection preventive film 311 was coated on the image viewing side of the second member, the deterioration of the contrast property was reduced significantly when an external light was injected in the screen. FIG. 36 shows a screen configuration provided with three wavelength selective filters 321 for the transmission type screen shown in FIG. 35.

Because a transmission type screen provided with a wavelength selective filter as described above is employed, the contrast property of projected images is prevented from deterioration effectively even when an external light is injected in the screen.

Finally, in the embodiments of the present invention, the first method for improving color purity is to dispose the dichroic mirrors DM1, DM2, and DM3 described above at places orthogonal to the polarized beam splitter PBS optically, thereby light fluxes which enter those dichroic mirrors can be s-polarized. Furthermore, because disposition of the dichroic mirrors is started at the white light source side in order of a dichroic mirror DM1 for transmitting cyan (blue and green) having the spectral transmittance characteristics shown in FIG. 27, a dichroic mirror DM2 for transmitting yellow @green and red) having the spectral transmittance characteristics shown in FIG. 26, and a dichroic mirror DM3 for transmitting red having the spectral transmittance characteristics shown in FIG. 25, and each of those dichroic mirrors is declined at a portion where the transmittance characteristics are changed sharply so as to obtain 6.4%/nm for the DM1, 6.8%/= for the DM2, and 6.8%/nm or over for the DM3. Each of the dichroic mirrors is declined sharply at the rising portion of the spectral transmittance characteristics, so that the color purity is improved.

Figure 21:
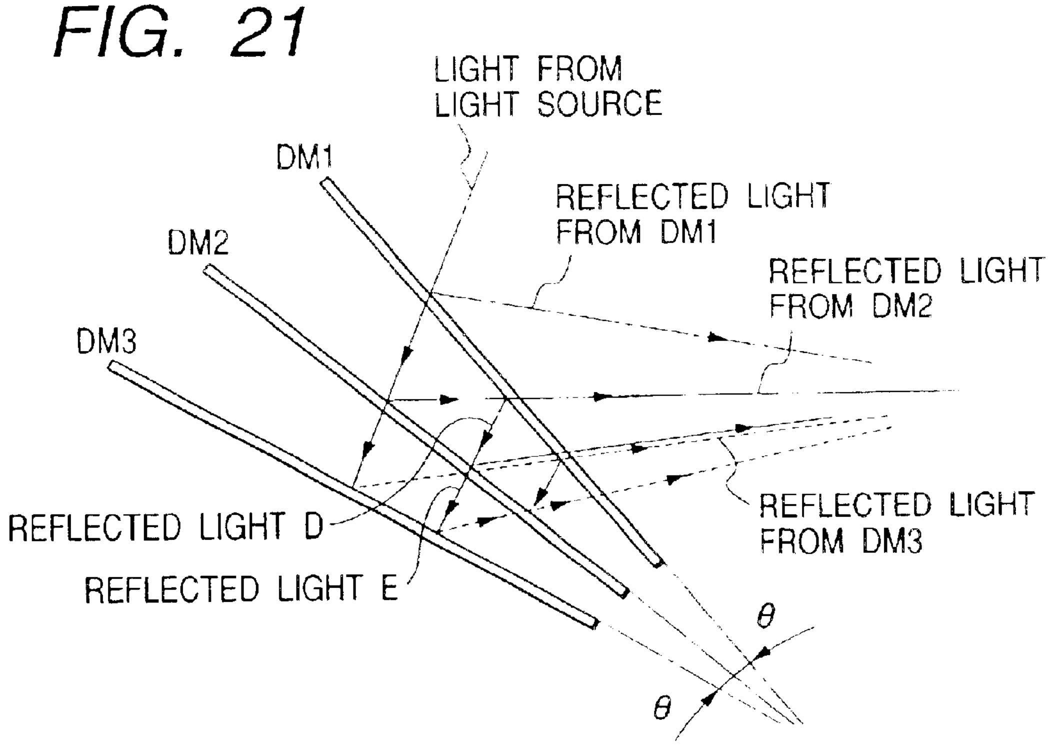
FIG. 21 is a cross sectional view of the main portion of the optical projection system for which a single-panel liquid crystal panel is employed.
Figure 22:
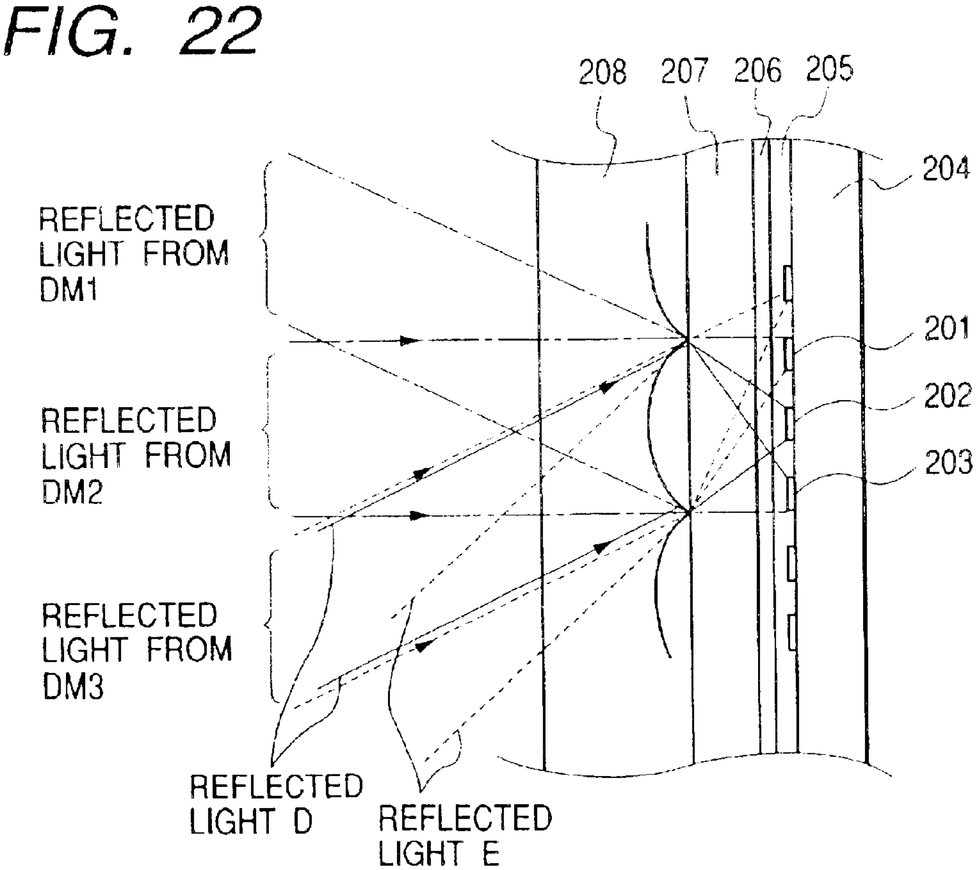
FIG. 22 is a cross sectional view of the main portion of the liquid crystal panel.
Figure 27:
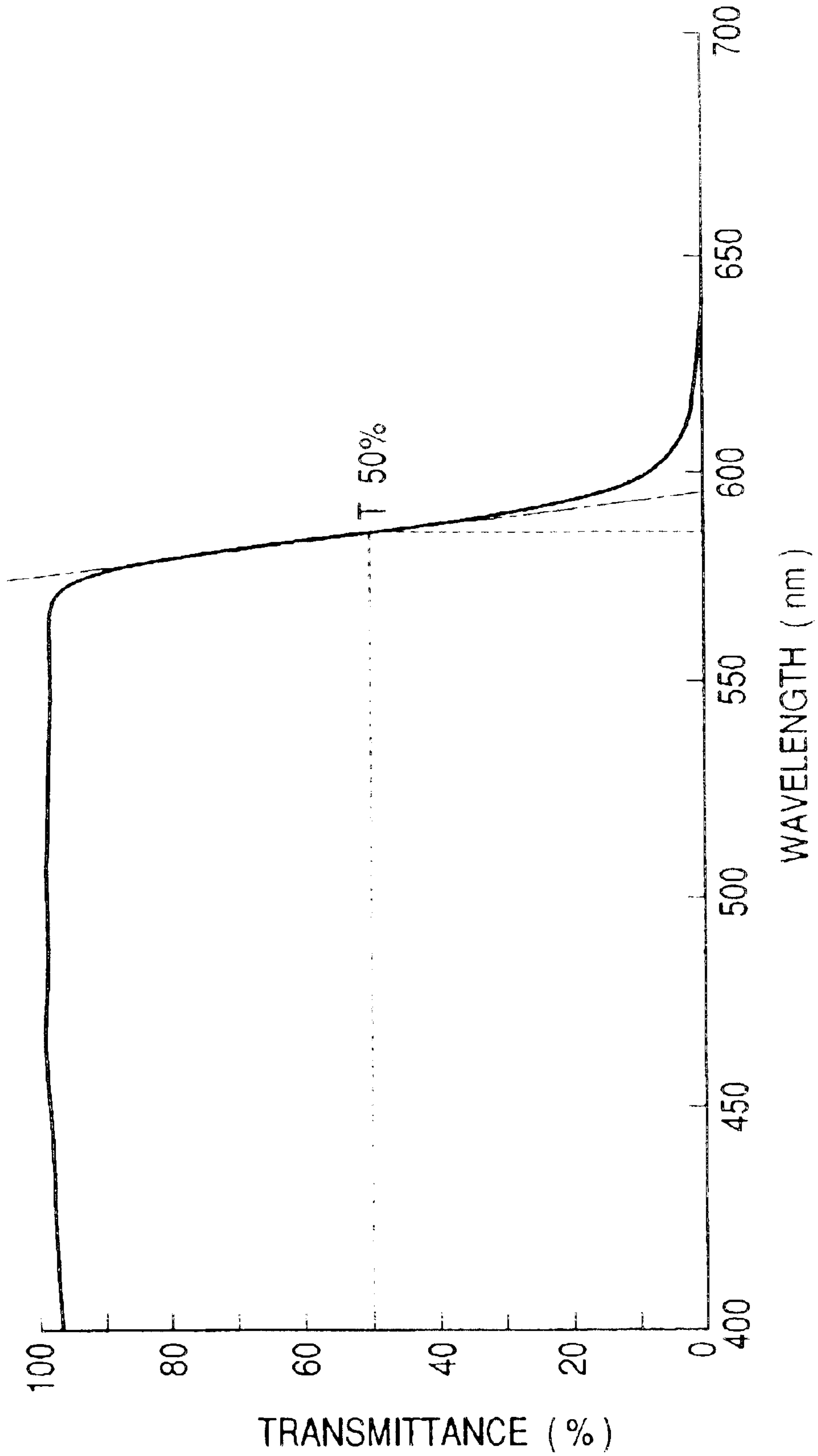
FIG. 27 is a characteristic chart indicating the spectrum transmission rate of the filter used for the optical system of the present invention.

Furthermore, because dichroic mirrors are disposed closely to each other as shown in FIG. 21, if the transmittance of the short wave area (a wavelength area of 560 nm or under) of the dichroic mirror DM1 for transmitting cyan (blue and green) having the spectral transmission characteristics shown in FIG. 27 is lowered by about 2%, then the red component, as well as the green and blue components are reflected on the DM1 and those colors are mixed, thereby the color purity is degraded. Furthermore, reflected lights D and E shown in FIG. 21 are also generated in the DM2, thereby the transmittance is degraded. Thus, reflected lights enter other portions than the normal TFT aperture as shown in FIG. 22, thereby the color purity is degraded.

In an examination performed by the inventor et al, it was found that if the deterioration of the transmittance was about 1%, no problem would arise practically, but if the reduction was suppressed within 0.5%, a more excellent color purity would be obtained.

Figure 4:
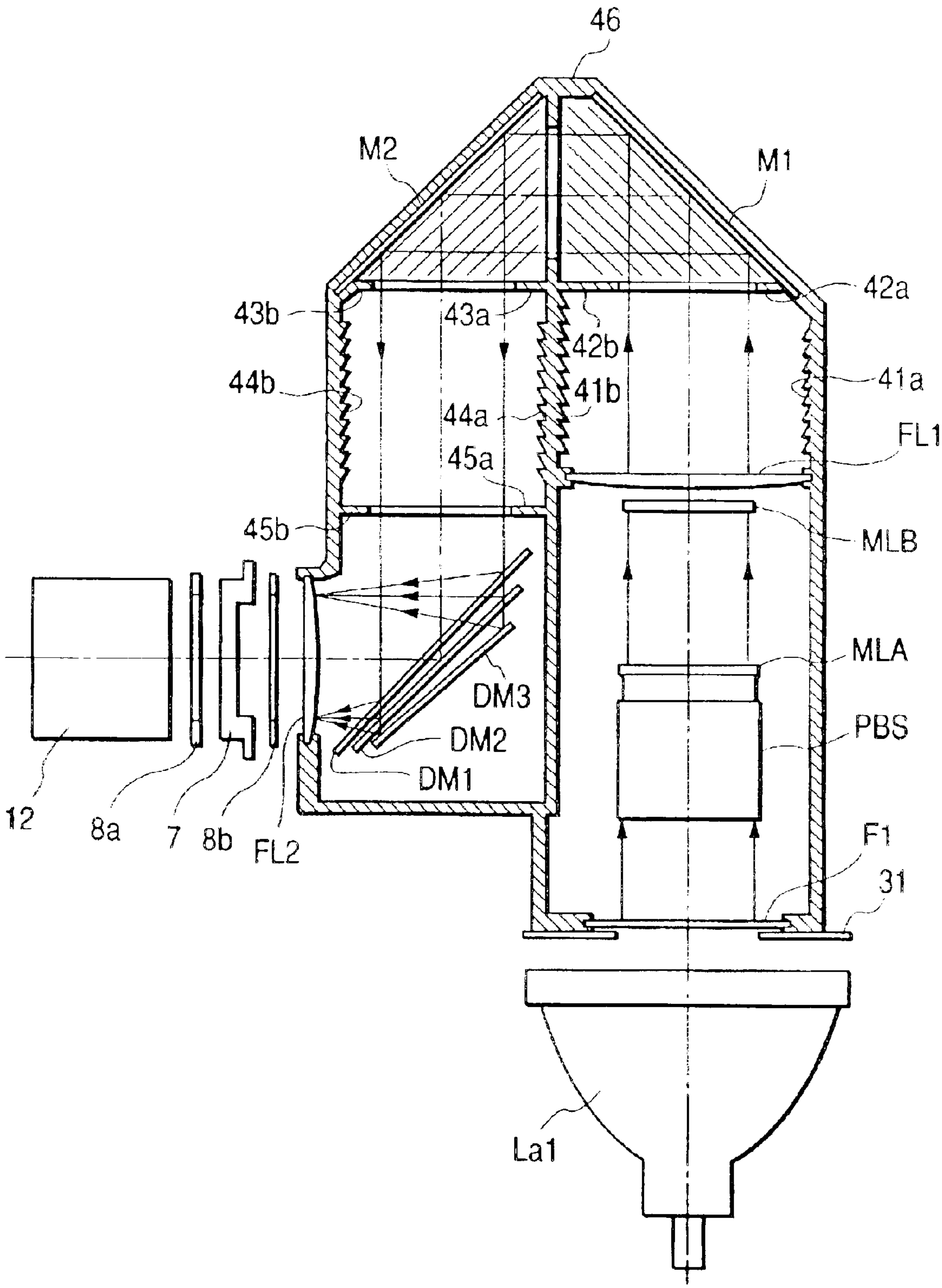
FIG. 4 is a cross sectional view showing the configuration of the main portion of the optical system of the present invention.

Furthermore, as the second method, the light fluxes separated by the respective lenses provided in the first multi-lens array close to the white light source La1 are expanded by a lens facing the second multi-lens array positioned at the side of the liquid crystal panel and projected on the liquid crystal panel as shown in FIG. 4. At this time, the light fluxes are separated in order of red, blue, and green according to the weakness of the spectral energy of the white light source La1 (the product between the emission energy of the lamp shown in FIG. 23 and the relative sensitivity shown in FIGS. 28 through 30). As a result, because the red light flux is the shortest in the light path between the second multi-lens array MLB and the liquid crystal panel 7, the projection magnification of the red light flux is reduced, thereby the energy density of the red light-flux is increased and the color purity is improved. Furthermore, as shown in FIG. 22, when the red light flux enters the micro-lens array of the liquid crystal panel, the red light flux is not adjacent to the green light flux (the reflected light on the DM3) whose relative sensitivity is the highest and whose emission spectrum of the light source is the strongest in the same micro-lens array 208, and part of the red light flux is dispersed at each junction between micro-lenses and it is not mixed with the red light flux (the reflected light on the DM1) whose emission spectrum of the light source is the weakest. The color purity is thus improved.

Furthermore, separated light fluxes do not enter the lens facing the second multi-lens array MLB positioned at the liquid crystal panel side due to the lost surface accuracy at each junction between lenses provided in the first multi-lens array close to the white light source as shown in FIG. 4, and some of those light fluxes enter adjacent lenses. (See FIG. 4.) As a result, each expanded light flux does not enter the liquid crystal panel at a normal angle, causing color mixing. At this time, those light fluxes enter the dichroic mirrors at different angles, thereby causing wavelength shifting and deterioration of the color purity. To avoid this problem, therefore, the third method is employed. According to this third method, the side surfaces, as well as the top and bottom surfaces of the projection optical unit are provided with saw teeth 41*a*, 41*b*, 44*a*, and 44*b* or are embossed, or matted so as to reduce the reflection factor on each of those surfaces, so that the energy of an abnormal light is reduced even when it is injected in the side surfaces, as well as the top and bottom faces of the projection optical unit. In addition, the light path is provided with aperture diaphragms 42*a*, 42*b*, 43*a*, 43*b*, 45*a*, and 45*b* in itself so as to block abnormal lights and absorb unnecessary light fluxes there, thereby reducing abnormal lights to be infected in the dichroic mirrors and suppressing the deterioration of each color purity.

Furthermore, the fifth method is employed so as to provide the transmission type screen with filtering characteristics for absorbing the green light emitted from the white light source with the strongest spectrum. Consequently, the green light mixed in both red and blue lights is reduced, thereby improving the color purity of each of the other color lights. Actually, a transmission type screen provided with the absorption characteristics shown in FIG. 37 was manufactured by way of trial by mixing a pigment in the second member of the transmission type screen composed as shown in FIG. 35 and whether or not each color purity was improved was checked. It was then found that the energy of the green light mixed in the red color was reduced when the light absorption was increased by 12% around the wavelength of 555 nm and the chromaticity of the red light (x=0.565, y=0.365) was improved to (x=0.581, y=0.371).

According to the present invention, therefore, the following effects have been obtained. (1) Because the projection lens unit comprises three lens groups starting at the screen side in order of a first lens group having a negative refractive power, a second lens group having a positive refractive power, and a third lens group having a negative refractive power, it is possible to obtain flat images even at an image angle as wide as nearly 90° and to focus those images in every corner favorably. (2) Because the first and third lens groups having a negative refractive power respectively are disposed symmetrically at both sides of the second lens group having a positive refractive power, the distortion of projected images can be suppressed to 1% or under even at an image angle as wide as nearly 90°. (3) Because the third lens group comprises aspheric lenses having a negative refractive power around the light axis and a positive refractive power at the periphery respectively, each lens of the third and second lens groups can be reduced in diameter. In addition, each light flux can be reduced in diameter, thereby the apparent object height can be reduced and each aberration can be corrected easily. (4) The projection lens unit of the present invention is composed so as to take a telecentric configuration, so it is possible to secure a sufficient light volume at the peripheral portion even at an image angle as wide as nearly 90°. (5) The lenses of the projection lens unit may be plastic aspheric ones if each of those lenses is unified in thickness. Consequently, those plastic aspheric lenses are disposed and combined to cancel the variation of each refractive power obtained by its local shape, caused by changes of the temperature and humidity, thereby the focusing property is reduced less due to changes of the shape and refractivity caused by temperature change and moisture absorption. (6) In the projection lens unit, a cooling medium whose refractivity is 1.2 or over is filled between each lens and the liquid crystal panel so as to couple them optically, thereby reducing the reflection loss of the image light and preventing the deterioration of the contrast property by the reflection of the image light. (7) Because a cooling liquid is filled between the liquid crystal panel and each lens, thereby cooling the liquid crystal panel and the polarizing plate, the liquid crystal panel and the polarizing plate can be protected from temperature rises. In addition, the use of this projection lens unit makes it possible to obtain bright and highly focused images in any portion of the screen, thereby providing a compact rear side projection type display unit. In addition, if the rear side projection type display unit is provided with a single-panel projection type optical unit, the following effects can be obtained. (1) The focusing property is improved. (2) The contrast property is improved. (3) Requirements of both color purity and brightness can be satisfied at the same time.

What is claimed is:

1. An optical projection apparatus, comprising:

an optical lighting system provided with a polarized beam splitter which polarizes a white light flux received from a white light source and combines the white light flux with other light flux, thereby to output a predetermined polarized wave;

a multi-lens array having a plurality of lens elements to receive the polarized light from the polarized beam splitter;

a light separator which separates the white light flux passed through the multi-lens array into three primary color light fluxes in the order of red, blue and green and irradiates the three color light fluxes on one display element; and a projection lens unit having a plurality of lens elements which project the three color light fluxes modulated by the display element to a screen;

wherein the display element receives the irradiated three color light fluxes from the light separator in the order of red, blue and green;

wherein the light separator separates the white light flux to red, blue and green in an order of weakness of a spectral energy distribution of the white light source.

2. An optical projection apparatus in accordance with claim 1, wherein dichroic mirrors DM1 for transmitting cyan (blue and green), DM2 for transmitting yellow (green and red), and DM3 for transmitting red from the white light source are employed as the light separator which separates the white light flux from the white light source into three primary color light fluxes in the order of red, blue, and green and irradiating each of the three primary color light fluxes to the same display element at an angle different from the others, the mirrors DM1, DM2, and DM3 being disposed in order so that the wavelength of each of the dichroic mirrors satisfies the corresponding condition shown below so as to assure a reflectivity of at least 50%

$\lambda DM1 > 585$ nm $\lambda DM2 < 520$ nm $\lambda DM3 > 580$ nm.

3. An optical projection apparatus in accordance with claim 1, wherein the light separator is dichroic-coated mirrors which separates the white light flux into three primary color light fluxes passed through the multi-lens array in the order of red, blue and green and irradiates each of the primary color light fluxes on one display element at an angle different from the others, so that the dichroic-coated mirrors are disposed to let a p-polarized light component be reflected as s-polarized light, the display element being provided with a ½ wavelength plate at an optical output side thereof, whereby light fluxes modulated by the display element are restored to p-polarized light again.

4. A projection type image display apparatus, comprising;

a white light source:

a light separator which separates white light flux output from the white light source and which passes separated flux through a polarized beam splitter and a micro-lens array in order of a red light flux, a blue light flux, and a green light flux in accordance with a proceeding direction of the light flux, and which injects separated light fluxes in an order of the red, blue and green light fluxes to a light injection surface side of a liquid crystal panel; and a projection lens unit having a plurality of lens elements which project the three color light fluxes modulated by the display element to a screen;

the light separator including:

a first dichroic mirror which transmits a cyan (blue and green) light flux;

a second dichroic mirror which transmits a yellow (green and red) light flux; and a third dichroic mirror which transmits a red light flux, with the first to third dichroic mirrors being disposed in accordance with a proceeding direction of the white light flux.

5. An optical projection apparatus in accordance with claim 1, wherein blue light flux irradiates on substantially a center of an injection pupil of the lens elements of the projection lens unit.

6. An optical projection apparatus in accordance with claim 1, wherein a part of red light flux is dispersed at a joint between adjacent ones of the lens elements of the projection lens unit.

7. An optical projection apparatus in accordance with claim 4, wherein blue light flux irradiates on substantially a center of an injection pupil of the lens elements of the projection lens unit.

8. An optical projection apparatus in accordance with claim 4, wherein a part of red light flux is dispersed at a joint between adjacent ones of the lens elements of the projection lens unit.

9. An optical projection apparatus, comprising:

an optical lighting means provided with a polarized beam splitter means for polarizing a white light flux received from a white light source and combining the white light flux with other light flux, for outputting a predetermined polarized wave;

a multi-lens means having a plurality of lens elements for receiving the polarized light from the polarized beam splitter;

a light separator means for separating the white light flux passed through the multi-lens means into three primary color light fluxes in the order of red, blue and green and irradiating the three color light fluxes on one display element means; and a projection lens means having a plurality of lens elements for projecting the three color light fluxes modulated by the display element means to a screen;

wherein the display element means receives the irradiated three color light fluxes from the light separator means in the order of red, blue and green;

wherein the light separator means is for separating the white light flux to red, blue and green in an order of weakness of a spectral energy distribution of the white light source.

10. An optical projection apparatus in accordance with claim 9, wherein dichroic mirror means DM1 for transmitting cyan (blue and green), DM2 for transmitting yellow (green and red), and DM3 for transmitting red from the white light source are employed as the light separating means for separating the white light flux from the white light source into three primary color light fluxes in the order of red, blue, and green and irradiating each of the three primary color light fluxes to the same display element means at an angle different from the others, the mirror means DM1, DM2, and DM3 being disposed in order so that the wavelength of each of the dichroic mirror means satisfies the corresponding condition shown below so as to assure a reflectivity of at least 50%

$\lambda$DM1>585 nm $\lambda$DM2<520 nm $\lambda$DM3>580 nm.

11. An optical projection apparatus in accordance with claim 9, wherein the light separator means is dichroic-coated mirror means for separating the white light flux into three primary color light fluxes passed through the multi-lens means in the order of red, blue and green and for irradiating each of the primary color light fluxes on one display element means an angle different from the others, so that the dichroic-coated mirror means are disposed to let a p-polarized light component be reflected as s-polarized light, the display element being provided with a ½ wavelength plate means at an optical output side thereof for restoring light fluxes modulated by the display element means to p-polarized light again.

12. A projection type image display apparatus, comprising:

a white light source;

a light separator means for separating white light flux output from the white light source and passing separated flux through a polarized beam splitter means and a micro-lens array means in order of a red light flux, a blue light flux, and a green light flux in accordance with a proceeding direction of the light flux, and for injecting separated light fluxes in an order of the red, blue and green light fluxes to a light injection surface side of a liquid crystal panel; and a projection tens means having a plurality of lens elements for projecting the three color light fluxes modulated by the display element means to a screen;

the light separator means including:

a first dichroic mirror means for transmitting a cyan (blue and green) light flux;

a second dichroic mirror means for transmitting a yellow (green and red) light flux; and a third dichroic mirror means for transmitting a red light flux, with the first to third dichroic mirror means being disposed in accordance with a proceeding direction of the white light flux.

13. An optical projection apparatus in accordance with claim 9, wherein blue light flux irradiates on substantially a center of an injection pupil of the lens elements of the projection lens means.

14. An optical projection apparatus in accordance with claim 9, wherein a part of red light flux is dispersed at a joint between adjacent ones of the lens elements of the projection lens means.

15. An optical projection apparatus in accordance with claim 12, wherein blue light flux irradiates on substantially a center of an injection pupil of the lens elements of the projection lens means.

16. An optical projection apparatus in accordance with claim 12, wherein a part of red light flux is dispersed at a joint between adjacent ones of the lens elements of the projection lens means.

* * * * *